US010776683B2

(12) United States Patent
Yi et al.

(10) Patent No.: US 10,776,683 B2
(45) Date of Patent: Sep. 15, 2020

(54) APPLICATION PROCESSING METHOD AND APPARATUS FOR EMBEDDED UNIVERSAL INTEGRATED CIRCUIT CARD

(71) Applicant: HUAWEI TECHNOLOGIES CO., LTD., Shenzhen, Guangdong (CN)

(72) Inventors: Qiang Yi, Beijing (CN); Shuiping Long, Beijing (CN); Linyi Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 16/079,529

(22) PCT Filed: Jan. 16, 2017

(86) PCT No.: PCT/CN2017/071321
§ 371 (c)(1),
(2) Date: Aug. 23, 2018

(87) PCT Pub. No.: WO2017/143885
PCT Pub. Date: Aug. 31, 2017

(65) Prior Publication Data

US 2019/0050704 A1 Feb. 14, 2019

(30) Foreign Application Priority Data

Feb. 25, 2016 (WO) ................ PCT/CN2016/074579

(51) Int. Cl.
*G06K 19/077* (2006.01)
*H04W 8/18* (2009.01)
(Continued)

(52) U.S. Cl.
CPC ..... *G06K 19/07739* (2013.01); *H04B 1/3816* (2013.01); *H04W 4/60* (2018.02);
(Continued)

(58) Field of Classification Search
CPC .... H04Q 4/60; H04W 12/0023; H04W 12/06; H04W 12/08; H04W 8/18; H04W 8/183; H04W 8/22; H04W 88/02; H04B 1/3816
See application file for complete search history.

(56) References Cited

U.S. PATENT DOCUMENTS

2014/0342719 A1 11/2014 Lindholm et al.
2016/0006762 A1 1/2016 Dumoulin et al.
(Continued)

FOREIGN PATENT DOCUMENTS

CN 103309758 A 9/2013
CN 103797827 A 5/2014
(Continued)

OTHER PUBLICATIONS

RSP Technical Specification Version 1.0, GSM Association, Jan. 13, 2016, pp. 1-114. XP055429434. Retrieved from the Internet:URL:https://www.kivi.nl/uploads/media/56c855898c796/SGP.22%20Technical%20Specification%20v.10.pdf.
(Continued)

*Primary Examiner* — Laura A Gudorf
(74) *Attorney, Agent, or Firm* — Fish & Richardson P.C.

(57) ABSTRACT

An application processing method and apparatus for an embedded universal integrated circuit card (eUICC) are disclosed. The method includes: activating, by a terminal device, an embedded universal integrated circuit card (eUICC); and selecting, by the terminal device, an Issuer Security Domain Root (ISD-R) application on the eUICC during an initialization process of the eUICC, to maintain a session between the terminal device and the eUICC. The session between the terminal device and the eUICC can be maintained during the initialization process of the eUICC.

20 Claims, 9 Drawing Sheets

(51) Int. Cl.

| | |
|---|---|
| ***H04W 4/60*** | (2018.01) |
| ***H04W 8/22*** | (2009.01) |
| ***H04W 12/06*** | (2009.01) |
| ***H04W 88/02*** | (2009.01) |
| ***H04W 12/00*** | (2009.01) |
| ***H04B 1/3816*** | (2015.01) |
| ***H04W 12/08*** | (2009.01) |

(52) U.S. Cl.

CPC ............. *H04W 8/18* (2013.01); *H04W 8/183* (2013.01); *H04W 8/22* (2013.01); *H04W 12/0023* (2019.01); *H04W 12/06* (2013.01); *H04W 12/08* (2013.01); *H04W 88/02* (2013.01)

(56) References Cited

U.S. PATENT DOCUMENTS

| | | | | |
|---|---|---|---|---|
| 2016/0020803 | A1 | 1/2016 | Cha et al. | |
| 2016/0021529 | A1 | 1/2016 | Park et al. | |
| 2017/0142159 | A1 | 5/2017 | Li et al. | |
| 2018/0123803 | A1* | 5/2018 | Park ...................... | H04W 8/205 |

FOREIGN PATENT DOCUMENTS

| | | | |
|---|---|---|---|
| CN | 105122769 | A | 12/2015 |
| CN | 105282731 | A | 1/2016 |
| CN | 105303377 | A | 2/2016 |
| EP | 2745541 | A1 | 6/2014 |
| FR | 3002408 | A1 | 8/2014 |
| WO | 2015149285 | A1 | 10/2015 |
| WO | 2016015401 | A1 | 2/2016 |

OTHER PUBLICATIONS

SCP TEC:“pCR TS 103 384 eUICC default file system”, ETSI TC SCP TEC Meeting #60, SCPTEC(15)000166r1, Sofia Antipolis, France, Nov. 2-6, 2015. total 2 pages.

ETSI TS 103 383 V13.0.0, Technical Specification, Smart Cards;Embedded UICC;Requirements Specification (Release 13). Oct. 2015. total 29 pages.

GSM Association Official Document SGP.02, Remote Provisioning Architecture for Embedded UICC Technical Specification Version 2.1. Nov. 2, 2015. total 297 pages.

ETSI TS 102 221 V13.0.0, Technical Specification, Smart Cards;UICC-Terminal interface;Physical and logical characteristics(Release 13). Sep. 2015. total 184 pages.

International Search Report issued in International Application No. PCT/CN2016/074579 dated May 10, 2016, 11 pages.

International Search Report and Written Opinion issued in International Application No. PCT/CN2017/071321 dated Apr. 20, 2017, 22 pages.

Extended European Search Report issued in European Application No. 17755714.7 dated Oct. 5, 2018, 9 pages.

* cited by examiner

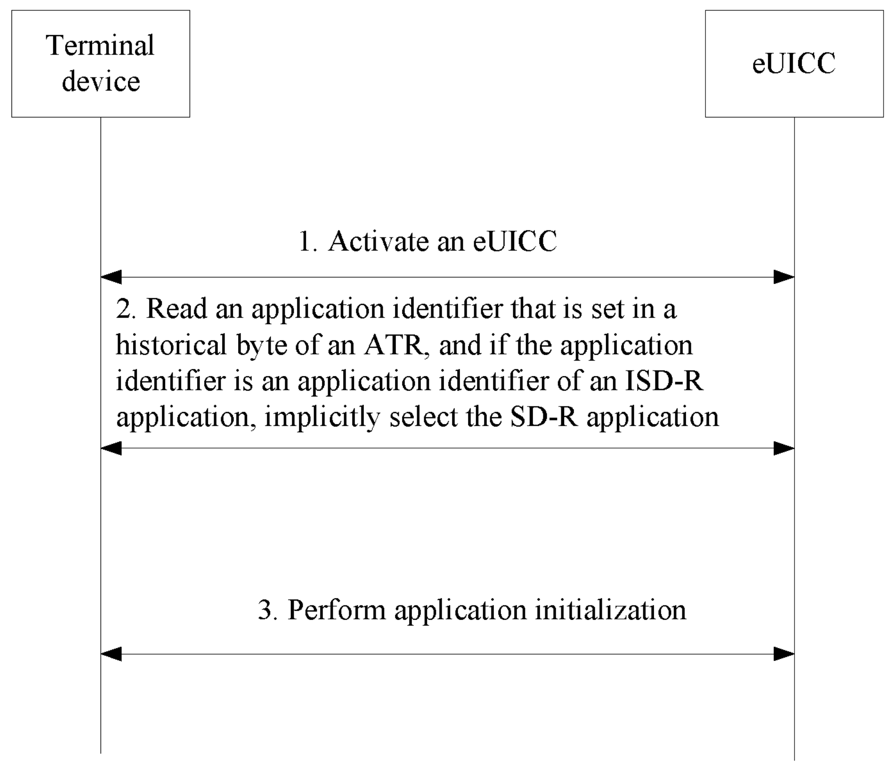
FIG. 2.1
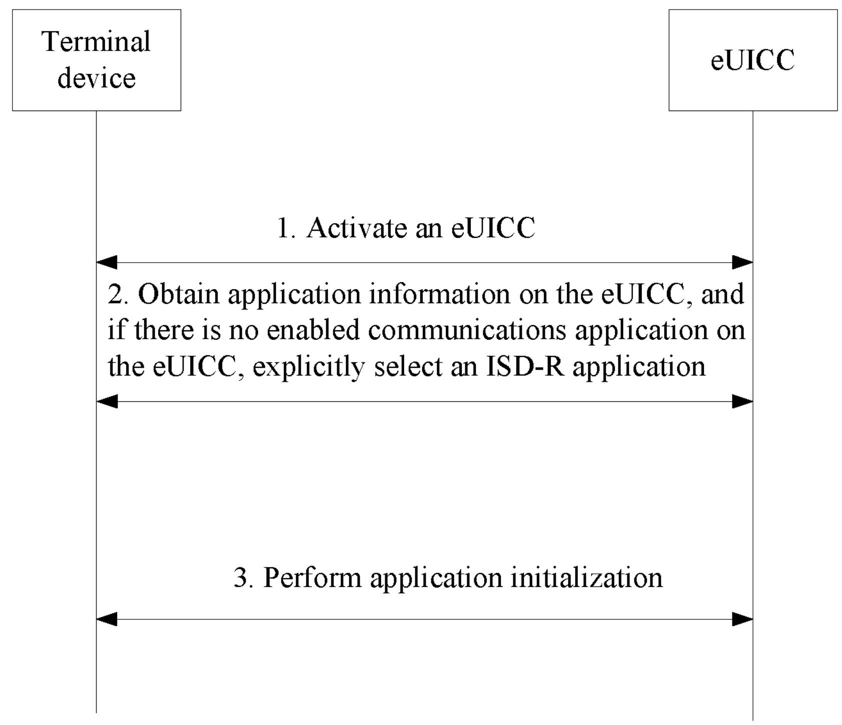
FIG. 2.2

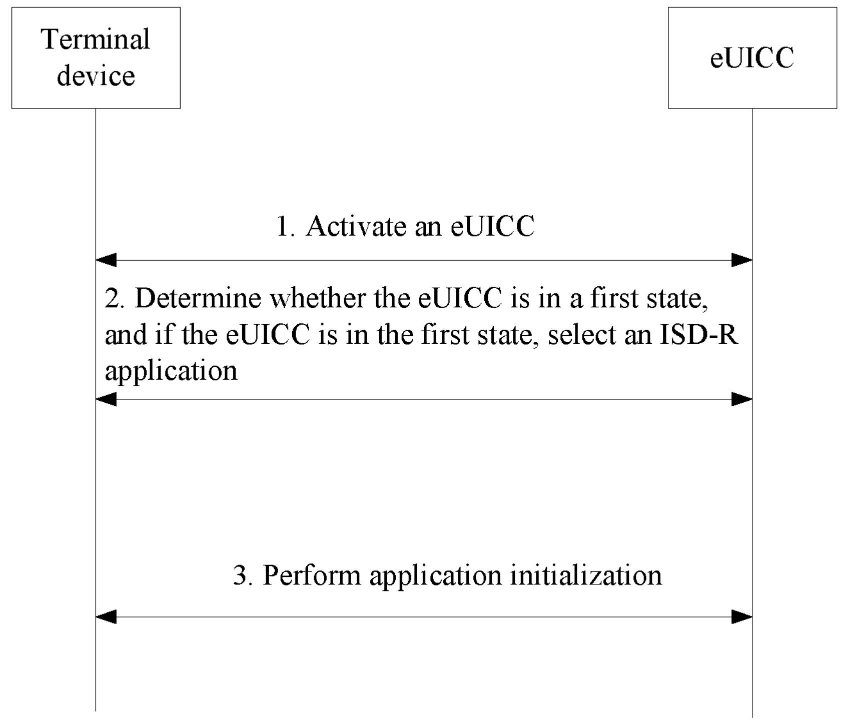
FIG. 2.3
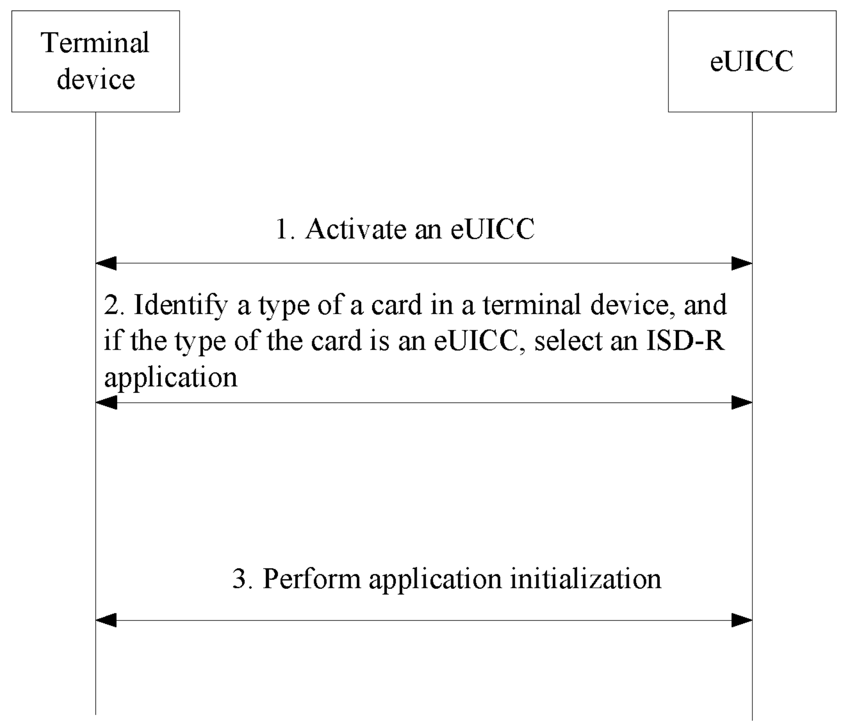
FIG. 2.4

APPLICATION PROCESSING METHOD AND APPARATUS FOR EMBEDDED UNIVERSAL INTEGRATED CIRCUIT CARD

CROSS-REFERENCE TO RELATED APPLICATIONS

This application is a national Stage of International Application No. PCT/CN2017/071321, filed on Jan. 16, 2017, which claims priority to International Patent Application No. PCT/CN2016/074579, filed on Feb. 25, 2016, both of the aforementioned applications are hereby incorporated by reference in their entireties.

TECHNICAL FIELD

The present invention relates to the field of communications technologies, and in particular, to an application processing method and apparatus for an embedded universal integrated circuit card.

BACKGROUND

An embedded universal integrated circuit card (embedded Universal Integrated Circuit Card, eUICC) is a universal integrated circuit card (Universal Integrated Circuit Card, UICC) embedded in a terminal device. A main difference between the UICC and the eUICC is as follows: A profile used to access a carrier network is written into the UICC during production, and after delivery, the profile on the UICC cannot be changed. A profile used to access any carrier network may not be written into the eUICC during production, and after delivery, a user can make a contract with a carrier according to the user's need and write a downloaded profile of a network of the carrier into the eUICC. The UICC and the eUICC each may include a plurality of communications applications, for example, a subscriber identity module (Subscriber Identity Module, SIM) application, a user identity module (User Identity Module, UIM) application, and a universal subscriber identity module (Universal Subscriber Identity Module, USIM) application. After initialization of a card (a UICC or an eUICC) is completed and a profile on the card is enabled, the card can be used to access a carrier network corresponding to the enabled profile.

Usually, an initialization process of the UICC mainly includes processes such as activation of the UICC, selection of a communications application, and initialization of the communications application. However, it is found in practice that there may be no communications application during an initialization process of the eUICC. To be specific, there is no enabled profile, used to access a carrier network, on the eUICC. In this case, a modem in the terminal device may consider the eUICC as an invalid card and therefore terminate a session between the terminal device and the eUICC.

SUMMARY

Embodiments of the present invention disclose an application processing method and apparatus for an embedded universal integrated circuit card. A session between a terminal device and an embedded universal integrated circuit card can be maintained during an initialization process of the embedded universal integrated circuit card.

A first aspect of the embodiments of the present invention discloses an application processing method for an embedded universal integrated circuit card, including:

activating, by a terminal device, an embedded universal integrated circuit card eUICC; and selecting, by the terminal device, an Issuer Security Domain Root ISD-R application on the eUICC during an initialization process of the eUICC, to maintain a session between the terminal device and the eUICC.

Regardless of whether there is a communications application on the eUICC, the terminal device selects the Issuer Security Domain Root ISD-R application on the eUICC during the initialization process of the eUICC, so that a modem may consider the eUICC as an invalid card. Therefore, the session between the terminal device and the embedded universal integrated circuit card is maintained.

With reference to the first aspect of the embodiments of the present invention, in a first possible implementation of the first aspect of the embodiments of the present invention, the selecting, by the terminal device, an Issuer Security Domain Root ISD-R application on the eUICC during an initialization process of the eUICC includes:

reading, by the terminal device during the initialization process of the eUICC, an application identifier that is set by the eUICC in a historical byte of an answer to reset ATR; and if the application identifier is an application identifier of the ISD-R application, implicitly selecting, by the terminal device, the ISD-R application based on the application identifier of the ISD-R application.

An application identifier indicated in an ATR process can be read to select the ISD-R application.

With reference to the first possible implementation of the first aspect of the embodiments of the present invention, in a second possible implementation of the first aspect of the embodiments of the present invention, the application identifier of the ISD-R application that is set by the eUICC in the historical byte of the ATR is set after the eUICC disables a profile on the eUICC, where the profile is information used to access a carrier network.

With reference to the first aspect of the embodiments of the present invention, in a third possible implementation of the first aspect of the embodiments of the present invention, the selecting, by the terminal device, an Issuer Security Domain Root ISD-R application on the eUICC during an initialization process of the eUICC includes:

obtaining, by the terminal device, application information on the eUICC during the initialization process of the eUICC, where an elementary file directory EFdir on the eUICC can be read to obtain the application information on the eUICC; and if there is no enabled communications application on the eUICC, explicitly selecting, by the terminal device, the ISD-R application, where the communications application is an application used to access a carrier network.

The EFdir on the eUICC can be read to obtain an application identifier of the ISD-R application, so as to select the ISD-R application.

With reference to the first aspect of the embodiments of the present invention, in a fourth possible implementation of the first aspect of the embodiments of the present invention, the selecting, by the terminal device, an Issuer Security Domain Root ISD-R application on the eUICC during an initialization process of the eUICC includes:

selecting, by the terminal device, the ISD-R application on the eUICC by using a modem in the terminal device during the initialization process of the eUICC.

With reference to the fourth possible implementation of the first aspect of the embodiments of the present invention, in a fifth possible implementation of the first aspect of the embodiments of the present invention, the method further includes:

sending, by the terminal device, a notification message to an application logic function module in the terminal device by using the modem, where the notification message includes information indicating that the ISD-R application is selected.

With reference to the fifth possible implementation of the first aspect of the embodiments of the present invention, in a sixth possible implementation of the first aspect of the embodiments of the present invention, the notification message further includes information indicating that a logical channel used by the ISD-R application is a basic logical channel.

With reference to the fifth possible implementation of the first aspect or the sixth possible implementation of the first aspect of the embodiments of the present invention, in a seventh possible implementation of the first aspect of the embodiments of the present invention, the method further includes:

obtaining, by the terminal device, eUICC information by using the application logic function module, where the eUICC information includes at least one of eUICC identity information, a profile on the eUICC, and eUICC capability information.

With reference to the first aspect to the third possible implementation of the first aspect of the embodiments of the present invention, in an eighth possible implementation of the first aspect of the embodiments of the present invention, the method further includes:

obtaining, by the terminal device, eUICC information by using a modem in the terminal device, and sending the eUICC information to an application logic function module in the terminal device, where the eUICC information includes at least one of eUICC identity information, a profile on the eUICC, and eUICC capability information.

A second aspect of the embodiments of the present invention discloses an application processing method for an embedded universal integrated circuit card, including:

disabling, by an embedded universal integrated circuit card eUICC, a first profile on the eUICC; and setting, by the eUICC in a historical byte of an answer to reset ATR, an application identifier to an application identifier of an Issuer Security Domain Root ISD-R application, where the application identifier of the ISD-R application is used by a terminal device in which the eUICC is located to select the ISD-R application based on the application identifier of the ISD-R application during an initialization process of the eUICC, to maintain a session between the terminal device and the eUICC.

When the eUICC disables the first profile on the eUICC, no enabled communications application exists on the eUICC. The eUICC sets the application identifier of the ISD-R application in the ATR. The terminal device may select the ISD-R application during the initialization process of the eUICC, so that a modem in the terminal device may consider the eUICC as an invalid card. Therefore, the session between the terminal device and the eUICC is maintained.

With reference to the second aspect of the embodiments of the present invention, in a first possible implementation of the second aspect of the embodiments of the present invention, after the disabling, by an embedded universal integrated circuit card eUICC, a first profile on the eUICC, the method further includes:

determining, by the eUICC, whether an enabled profile exists on the eUICC; and if no enabled profile exists on the eUICC, performing the step of setting, by the eUICC in a historical byte of an answer to reset ATR, an application identifier to an application identifier of an Issuer Security Domain Root ISD-R application.

There may be only one enabled profile on the eUICC at a same moment, or there may be a plurality of enabled profiles on the eUICC at a same moment. No limitation is imposed in the embodiments of the present invention. When a plurality of enabled profiles exist on the eUICC at the same moment, after the eUICC disables a profile, the eUICC needs to further determine whether an enabled profile exists on the eUICC.

With reference to the first possible implementation of the second aspect of the embodiments of the present invention, in a second possible implementation of the second aspect of the embodiments of the present invention, the determining, by the eUICC, whether an enabled profile exists on the eUICC includes:

determining, by the eUICC, whether an elementary file directory EFdir exists in a file system of the eUICC, and if no elementary file directory EFdir exists in the file system of the eUICC, determining that no enabled profile exists on the eUICC; or determining, by the eUICC, whether the eUICC is in a first state, and if the eUICC is in the first state, determining that no enabled profile exists on the eUICC, where the first state indicates that there is no enabled profile on the eUICC; or determining, by the eUICC, whether metadata information corresponding to the enabled profile exists on the eUICC, and if no metadata information corresponding to the enabled profile exists on the eUICC, determining that no enabled profile exists on the eUICC.

With reference to the second aspect to the second possible implementation of the second aspect, in a third possible implementation of the second aspect, the method further includes:

enabling, by the eUICC, a second profile on the eUICC; and deleting, by the eUICC, the application identifier of the ISD-R application that is set in the historical byte of the ATR.

With reference to the third possible implementation of the second aspect, in a fourth possible implementation of the second aspect, the method further includes:

adding, by the eUICC, the application identifier of the ISD-R application to the elementary file directory EFdir of the eUICC.

The terminal device selects an application by reading application information of the elementary file directory EFdir. Therefore, after the eUICC enables the second profile on the eUICC, the eUICC further needs to add the application identifier of the ISD-R application to the EFdir of the eUICC, so that subsequently, before selecting the ISD-R application, the terminal device needs to read the EFdir to obtain the identifier of the ISD-R application.

A third aspect of the embodiments of the present invention discloses an application processing apparatus, applied to a terminal device. The application processing apparatus includes a function unit configured to perform some or all steps of the method according to any implementation of the first aspect of the embodiments of the present invention. When the application processing apparatus performs some or all steps of the method according to any implementation of the first aspect, a session between the terminal device and an embedded universal integrated circuit card can be maintained during an initialization process of the embedded universal integrated circuit card.

A fourth aspect of the embodiments of the present invention discloses an application processing apparatus, applied to an embedded universal integrated circuit card eUICC. The application processing apparatus includes a function unit configured to perform some or all steps of the method according to any implementation of the second aspect of the embodiments of the present invention. When the application processing apparatus performs some or all steps of the method according to any implementation of the second aspect, a session between a terminal device and the embedded universal integrated circuit card can be maintained during an initialization process of the embedded universal integrated circuit card.

A fifth aspect of the embodiments of the present invention discloses an application processing apparatus, applied to a terminal device. The application processing apparatus includes a processor, an input apparatus, an output apparatus, and a memory. The memory is configured to store an instruction, the processor is configured to run the instruction, and the processor runs the instruction to perform some or all steps of the method according to any implementation of the first aspect of the embodiments of the present invention. When the application processing apparatus performs some or all steps of the method according to any implementation of the first aspect, a session between the terminal device and an embedded universal integrated circuit card can be maintained during an initialization process of the embedded universal integrated circuit card.

A sixth aspect of the embodiments of the present invention discloses an application processing apparatus, applied to an embedded universal integrated circuit card eUICC. The application processing apparatus includes a processor and a memory. The memory is configured to store an instruction, the processor is configured to run the instruction, and the processor runs the instruction to perform some or all steps of the method according to any implementation of the second aspect of the embodiments of the present invention. When the application processing apparatus performs some or all steps of the method according to any implementation of the second aspect, a session between a terminal device and the embedded universal integrated circuit card can be maintained during an initialization process of the embedded universal integrated circuit card.

A seventh aspect of the embodiments of the present invention discloses an application processing system for an embedded universal integrated circuit card, including a terminal device and an embedded universal integrated circuit card eUICC.

The eUICC is configured to disable a first profile on the eUICC.

The eUICC is further configured to set, in a historical byte of an answer to reset ATR, an application identifier to an application identifier of an Issuer Security Domain Root ISD-R application.

The terminal device is configured to activate the eUICC.

The terminal device is further configured to: read, during an initialization process of the eUICC, the application identifier that is set by the eUICC in the historical byte of the ATR; and if the application identifier is the application identifier of the ISD-R application, implicitly select the ISD-R application based on the application identifier of the ISD-R application, to maintain a session between the terminal device and the eUICC.

With reference to the seventh aspect of the embodiments of the present invention, in a first possible implementation of the seventh aspect of the embodiments of the present invention, the terminal device is further configured to send a notification message to an application logic function module in the terminal device by using a modem in the terminal device, where the notification message includes information indicating that the ISD-R application is selected.

Optionally, the notification message further includes information indicating that a logical channel used by the ISD-R application is a basic logical channel.

With reference to the first possible implementation of the seventh aspect of the embodiments of the present invention, in a second possible implementation of the seventh aspect of the embodiments of the present invention, the terminal device is further configured to obtain eUICC information by using the application logic function module, where the eUICC information includes at least one of eUICC identity information, a profile on the eUICC, and eUICC capability information.

With reference to the seventh aspect of the embodiments of the present invention, in a third possible implementation of the seventh aspect of the embodiments of the present invention, the terminal device is further configured to: obtain eUICC information by using a modem in the terminal device, and send the eUICC information to an application logic function module in the terminal device, where the eUICC information includes at least one of eUICC identity information, a profile on the eUICC, and eUICC capability information.

With reference to the seventh aspect of the embodiments of the present invention, in a fourth possible implementation of the seventh aspect of the embodiments of the present invention, the eUICC is further configured to enable a second profile on the eUICC; and the eUICC is further configured to delete the application identifier of the ISD-R application that is set in the historical byte of the ATR.

With reference to the fourth possible implementation of the seventh aspect of the embodiments of the present invention, in a fifth possible implementation of the seventh aspect of the embodiments of the present invention, the eUICC is further configured to add the application identifier of the ISD-R application to the elementary file directory EFdir of the eUICC.

An eighth aspect of the embodiments of the present invention discloses an application processing method for an embedded universal integrated circuit card, including:

activating, by a terminal device, an embedded universal integrated circuit card eUICC;

selecting, by the terminal device, an Issuer Security Domain Root ISD-R application on the eUICC during an initialization process of the eUICC; and obtaining, by the terminal device, eUICC information.

Optionally, after the obtaining, by the terminal device, eUICC information, the method further includes:

sending, by the terminal device, the eUICC information to an application logic function module in the terminal device.

Optionally, the eUICC information includes:

at least one of eUICC identity information, information about a profile on the eUICC, and eUICC capability information.

Optionally, when the eUICC information includes the information about the profile on the eUICC, the profile on the eUICC includes:

at least one of information about all profiles on the eUICC, information about an enabled profile on the eUICC, information about a disabled profile on the eUICC, information about a preconfigured-type profile on the eUICC, information about a test-type profile on the eUICC, information indicating that there is no operable profile on the eUICC, and information indicating that there is no enabled profile on the eUICC.

Optionally, when the eUICC information includes the eUICC capability information, the eUICC capability information includes:

at least one of a protocol version number supported by the eUICC, an identifier of a key supported by the eUICC, a category of the eUICC, and capability information of a local profile assistant LPA supported by the eUICC.

Optionally, when the eUICC capability information includes the protocol version number supported by the eUICC, the method further includes:

obtaining, by the terminal device by using the application logic function module, the protocol version number supported by the eUICC, and determining, based on the protocol version number supported by the eUICC, a protocol version number used for communication between the application logic function module and the eUICC.

Optionally, when the eUICC capability information includes the capability information of the LPA supported by the eUICC, the method further includes:

after the application logic function module obtains the capability information of the LPA supported by the eUICC, determining, by the terminal device by using the application logic function module, whether capability information of an LPA that is on the eUICC and that is supported by the terminal device matches the capability information of the LPA supported by the eUICC, and if the capability information of the LPA that is on the eUICC and that is supported by the terminal device matches the capability information of the LPA supported by the eUICC, communicating, by the terminal device, with the LPA on the eUICC by using the application logic module.

Optionally, when the eUICC capability information includes the capability information of the LPA supported by the eUICC, the method further includes:

after the application logic function module obtains the capability information of the LPA supported by the eUICC, determining, by the application logic function module based on the capability information of the LPA supported by the eUICC, whether to activate the LPA.

Optionally, a logical channel used by the ISD-R application is a basic logical channel.

Optionally, after the selecting, by the terminal device, an Issuer Security Domain Root ISD-R application on the eUICC, the method further includes: terminating, by the terminal device, the ISD-R application.

Optionally, the terminating, by the terminal device, the ISD-R application includes:

after the terminal device completes initialization of the eUICC, terminating, by the terminal device, the ISD-R application; or after the selecting, by the terminal device, an Issuer Security Domain Root ISD-R application on the eUICC, starting a timer, and after the timer expires, terminating the selected ISD-R application; or after a local profile assistant LPA of the terminal device initiates an instruction to select an ISD-R application, terminating, by the terminal device, the selected ISD-R application, and executing the instruction that is initiated by the LPA of the terminal device and that is used to select the ISD-R application; or after the terminal device receives the eUICC information by using the application logic function module, sending, by the terminal device, a response message by using the application logic function module, and after the terminal device receives the response message, terminating the ISD-R application.

A ninth aspect of the embodiments of the present invention discloses an application processing method for an embedded universal integrated circuit card, including:

activating, by a terminal device, an embedded universal integrated circuit card eUICC;

selecting, by the terminal device, an Issuer Security Domain Root ISD-R application on the eUICC during an initialization process of the eUICC;

obtaining, by the terminal device, eUICC capability information; and storing, by the terminal device, the eUICC capability information.

The eUICC capability information includes:

at least one of a protocol version number supported by the eUICC, an identifier of a key supported by the eUICC, a category of the eUICC, and capability information of a local profile assistant LPA supported by the eUICC.

Optionally, the eUICC capability information includes the capability information of the local profile assistant LPA supported by the eUICC, and the method further includes:

when receiving that the terminal device activates the local profile assistant LPA on the eUICC by using an application logic function module, determining, by the terminal device based on the capability information of the LPA supported by the eUICC, whether the application logic function module is supported in activating the LPA on the eUICC, and if the application logic function module is not supported in activating the LPA on the eUICC, rejecting the application logic function module to activate the LPA on the eUICC.

A tenth aspect of the embodiments of the present invention discloses an application processing apparatus, applied to a terminal device. The application processing apparatus includes a function unit configured to perform some or all steps of the method according to any implementation of the eighth aspect of the embodiments of the present invention.

An eleventh aspect of the embodiments of the present invention discloses an application processing apparatus, applied to a terminal device. The application processing apparatus includes a function unit configured to perform some or all steps of the method according to any implementation of the ninth aspect of the embodiments of the present invention.

A twelfth aspect of the embodiments of the present invention discloses a computer storage medium. The computer storage medium stores a program, and the program specifically includes an instruction used to perform some or all steps of the method according to any implementation of the first aspect of the embodiments of the present invention.

A thirteenth aspect of the embodiments of the present invention discloses a computer storage medium. The computer storage medium stores a program, and the program specifically includes an instruction used to perform some or all steps of the method according to any implementation of the second aspect of the embodiments of the present invention.

A fourteenth aspect of the embodiments of the present invention discloses a computer storage medium. The computer storage medium stores a program, and the program specifically includes an instruction used to perform some or all steps of the method according to any implementation of the eighth aspect of the embodiments of the present invention.

A fifteenth aspect of the embodiments of the present invention discloses a computer storage medium. The computer storage medium stores a program, and the program specifically includes an instruction used to perform some or all steps of the method according to any implementation of the ninth aspect of the embodiments of the present invention.

In some feasible implementations, a terminal device may determine whether an eUICC is in a first state.

If the eUICC is in the first state, the terminal device selects an ISD-R application, where the first state indicates that there is no enabled profile on the eUICC.

The terminal device may select the ISD-R application based on a status of the eUICC.

In some feasible implementations, the terminal device may identify a type of a card in the terminal device. If the type of the card is an eUICC, the terminal device selects the ISD-R application by using a modem.

The terminal device may select the ISD-R application based on the type of the card in the terminal device.

In some feasible implementations, during an initialization process of the embedded universal integrated circuit card eUICC, the terminal device can obtain the status of the eUICC. If the status of the eUICC is the first state, the terminal device can maintain a session between the terminal device and the eUICC without selecting any application. The first state indicates that there is no enabled profile on the eUICC.

In some feasible implementations, the terminal device can read application information in an elementary file directory EFdir by using the modem during an initialization process of the embedded universal integrated circuit card eUICC. If the application information does not include application information of a communications application, the terminal device can maintain the session between the terminal device and the eUICC without selecting any application.

In the embodiments of the present invention, the terminal device applies a voltage to the embedded universal integrated circuit card eUICC to activate the eUICC. Further, the terminal device selects the Issuer Security Domain Root ISD-R application on the eUICC during the initialization process of the eUICC, to maintain the session between the terminal device and the eUICC. It can be learned that in the embodiments of the present invention, during the initialization process of the eUICC, if there is no communications application on the eUICC, the terminal device selects the ISD-R application on the eUICC, so that the modem may consider the eUICC as an invalid card. Therefore, the session between the terminal device and the embedded universal integrated circuit card is maintained.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2.1 is a schematic diagram of another initialization process of an eUICC disclosed in an embodiment of the present invention;

FIG. 2.2 is a schematic diagram of still another initialization process of an eUICC disclosed in an embodiment of the present invention;

FIG. 2.3 is a schematic diagram of yet another initialization process of an eUICC disclosed in an embodiment of the present invention;

FIG. 2.4 is a schematic diagram of still yet another initialization process of an eUICC disclosed in an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", and so on are intended to distinguish between different objects but do not indicate a particular order. In addition, the terms "include", "have", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present invention disclose an application processing method and apparatus for an embedded universal integrated circuit card. A session between a terminal device and an embedded universal integrated circuit card can be maintained during an initialization process of the embedded universal integrated circuit card. The following separately provides detailed descriptions.

To better understand the embodiments of the present invention, the following first describes an initialization process of an eUICC disclosed in an embodiment of the present invention.

Figure 1:
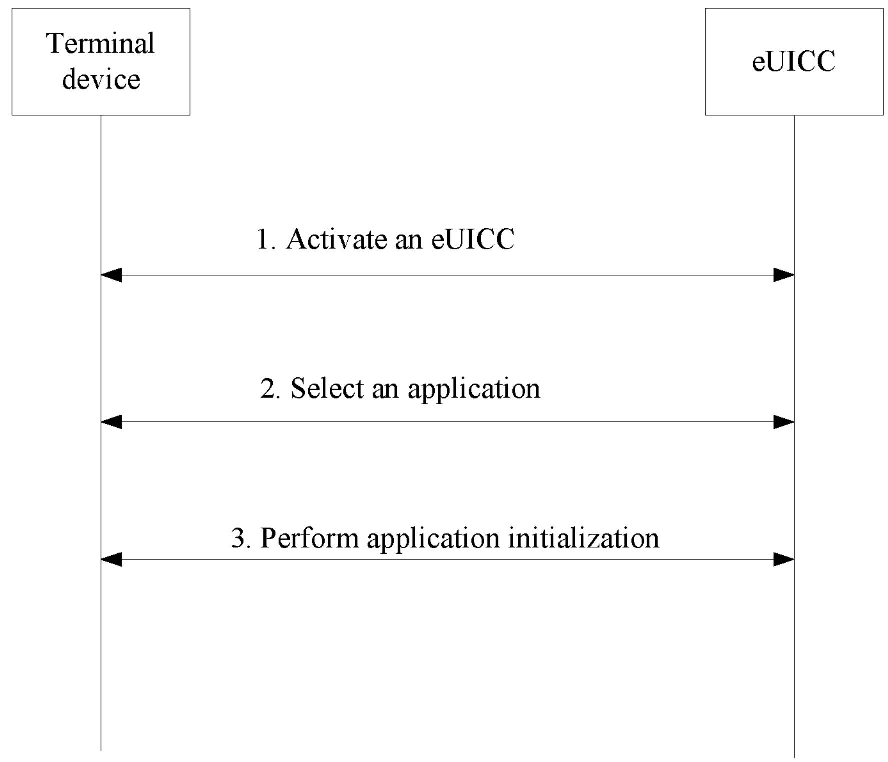
FIG. 1 is a schematic diagram of an initialization process of an eUICC disclosed in an embodiment of the present invention.

Referring to FIG. 1, FIG. 1 is a schematic diagram of an initialization process of an eUICC disclosed in an embodiment of the present invention. As shown in FIG. 1, a terminal device and an eUICC may be included. The embedded universal integrated circuit card eUICC is applied to the terminal device, and stores information such as a profile of a user. The eUICC is readable and writable. The eUICC can download one or more profiles from a carrier or change a downloaded profile. The profile is a representation form of a carrier subscription that a user applies for on the eUICC. The profile on the eUICC may be a combination of a file structure, data, or an application. After a profile is enabled, information in the profile is used by the terminal device to access a carrier network that is applied for. Therefore, a profile on the eUICC corresponds to a communications application that the user applies for on the eUICC, for example, a common subscriber identity module (Subscriber Identity Module, SIM) application, user identity module (User Identity Module, UIM) application, or universal subscriber identity module (Universal Subscriber Identity Module, USIM) application. The terminal device may include but is not limited to various user terminals such as a smartphone, a notebook computer, a personal computer (Personal Computer, PC), a personal digital assistant (Personal Digital Assistant, PDA), a mobile Internet device (Mobile Internet Device, MID), and a smart wearable device (for example, a smart watch or a smart band). In addition, the terminal device may further include a modem modem and an application function module (for example, a local profile assistant (Local Profile Assistant, LPA)). It should be noted that the eUICC and the terminal device shown in FIG. 1 may be two independent modules. Alternatively, in actual application, the eUICC may be embedded in the terminal device.

As shown in FIG. 1, the initialization process of the eUICC mainly includes the following three steps: 1. Activate the eUICC. 2. Select an application. 3. Perform application initialization. The application selected during the initialization process may be a communications application or an application (for example, an Issuer Security Domain Root ISD-R application) on the eUICC.

Specifically, in step 1, the terminal device is powered on to start an activation process of the eUICC. During the activation process of the eUICC, the terminal device applies a voltage and provides a clock to the eUICC, and the eUICC returns answer to reset (Answer To Reset, ATR) information to the modem in the terminal device, and performs a required protocol and parameter selection (Protocol and Parameter Selection, PPS) process. In step 2, the terminal device may select the communications application or the ISD-R application on the eUICC. In step 3, the application initialization may be performed by the modem in the terminal device, or the application initialization may be performed by the LPA in the terminal device. During a process of performing the application initialization, eUICC information may be obtained. The eUICC information includes at least one of eUICC identity information, a profile on the eUICC, and eUICC capability information.

Figure 2:
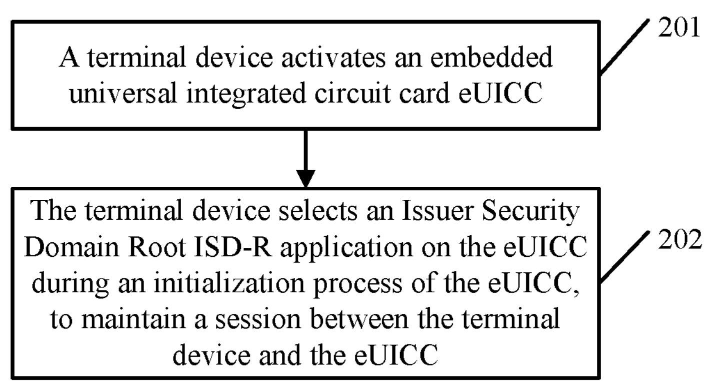
FIG. 2 is a schematic flowchart of an application processing method for an embedded universal integrated circuit card disclosed in an embodiment of the present invention.

Referring to FIG. 2, FIG. 2 is a schematic flowchart of an application processing method for an embedded universal integrated circuit card disclosed in an embodiment of the present invention. The method is applied to a terminal device. As shown in FIG. 2, the method may include the following steps.

201. The terminal device activates an embedded universal integrated circuit card eUICC.

In this embodiment of the present invention, when the terminal device is powered on (to be specific, when the terminal device is connected to a power supply), the terminal device can apply a voltage to the embedded universal integrated circuit card eUICC to activate the eUICC.

Specifically, when the terminal device is powered on, an activation process of the eUICC is started. During the activation process of the eUICC, the terminal device applies a voltage and provides a clock to the eUICC, and the eUICC returns answer to reset (Answer To Reset, ATR) information to a modem in the terminal device, and performs a required protocol and parameter selection (Protocol and Parameter Selection, PPS) process. The ATR information may include but is not limited to an interface characteristic, a historical byte, and the like.

202. The terminal device selects an Issuer Security Domain Root ISD-R application on the eUICC during an initialization process of the eUICC, to maintain a session between the terminal device and the eUICC.

In this embodiment of the present invention, the eUICC includes an Issuer Security Domain Root ISD-R, an Issuer Security Domain Profile ISD-P, and another logic function module (for example, an eUICC Controlling Authority Security Domain eUICC ECASD).

It should be noted that a Chinese translation of ISD-R is not limited to Issuer Security Domain Root, a Chinese translation of ISD-P is not limited to Issuer Security Domain Profile, and a Chinese translation of ECASD is not limited to Controlling Authority Security Domain.

The ISD-R is an application of the eUICC, and is used to create and manage the ISD-P. The ISD-P is a container of a profile. There may be a plurality of ISD-Ps on the eUICC. Each ISD-P includes information about different profiles.

The ISD-R application interacts with an application logic function module (which is a local profile assistant (Local Profile Assistant, LPA)) in an application layer of the terminal device, for example, receives a command from the LPA to perform an operation such as enabling or disabling a profile, or receives a command from the LPA to return a certificate and signature information that are used for authentication on a network side, or receives a command from the LPA to return information about the profile on the eUICC.

A function of the LPA is mainly receiving a profile and downloading the profile to the eUICC, discovering a profile download service, and providing a UI interface to a user.

The terminal device may select the Issuer Security Domain Root ISD-R application on the eUICC in a plurality of trigger manners during the initialization process of the eUICC, to maintain the session between the terminal device and the eUICC.

In an optional implementation, a manner of the selecting, by the terminal device, an Issuer Security Domain Root ISD-R application on the eUICC during an initialization process of the eUICC is specifically:

reading, by the terminal device during the initialization process of the eUICC, an application identifier that is set by the eUICC in a historical byte of an answer to reset ATR; and if the application identifier is an application identifier of the ISD-R application, implicitly selecting, by the terminal device, the ISD-R application based on the application identifier of the ISD-R application.

The application identifier of the ISD-R application that is set by the eUICC in the historical byte of the ATR is set after the eUICC disables a profile on the eUICC, where the profile is information used to access a carrier network. Regardless of whether there is an enabled communications application on the eUICC, the terminal device implicitly selects the ISD-R application to ensure validity of the eUICC.

Referring to FIG. 2.1 as well, FIG. 2.1 is a schematic diagram of another initialization process of an eUICC disclosed in an embodiment of the present invention. FIG. 2.1 is obtained through further optimization on the basis of FIG. 1. Step 2 in FIG. 2.1 is a specific implementation of step 2 in FIG. 1.

Specifically, during the initialization process of the eUICC, the terminal device may read, by using the modem in the terminal device, an application identifier that is set by the eUICC in a historical byte of an answer to reset ATR. If the application identifier is an application identifier of the ISD-R application, the terminal device may implicitly select the ISD-R application by using the modem based on the application identifier of the ISD-R application. That the terminal device may read the application identifier in the ATR by using the modem in the terminal device means that the modem in the terminal device reads the application identifier in the ATR. Likewise, that the terminal device may select the ISD-R application by using the modem means that the modem in the terminal device selects the ISD-R application. The following is the same.

In another optional implementation, a manner of the selecting, by the terminal device, an Issuer Security Domain Root ISD-R application on the eUICC during an initialization process of the eUICC is specifically:

obtaining, by the terminal device, application information on the eUICC during the initialization process of the eUICC; and if there is no enabled communications application on the eUICC, explicitly selecting, by the terminal device, the ISD-R application, where the communications application is an application used to access a carrier network.

Referring to FIG. 2.2 as well, FIG. 2.2 is a schematic diagram of still another initialization process of an eUICC disclosed in an embodiment of the present invention. FIG. 2.2 is obtained through further optimization on the basis of FIG. 1. Step 2 in FIG. 2.2 is a specific implementation of step 2 in FIG. 1.

Specifically, the terminal device may read an elementary file directory EFdir (Elementary File DIRectory, EFdir) on the eUICC by using the modem during the initialization process of the eUICC, to obtain application information on the eUICC. The application information on the eUICC may be application information of the communications application, for example, SIM application information, UIM application information, or USIM application information. Alternatively, the application information on the eUICC may be application information of all applications on the eUICC. If there is no enabled communications application on the eUICC, the terminal device explicitly selects the ISD-R application by using the modem.

In this optional implementation, the terminal device obtains the application information on the eUICC during the initialization process of the eUICC. If there is an enabled communications application on the eUICC, and during the initialization process of the eUICC, the terminal device obtains application information of the ISD-R or learns that the card is the eUICC and application information of the ISD-R is preconfigured, the terminal device may select the ISD-R application or may not select the ISD-R application. No limitation is imposed in this embodiment of the present invention. In this optional implementation, a specific manner of obtaining the application information and selecting the ISD-R application is the same as the foregoing manner. Details are not described herein again.

In still another optional implementation, a manner of the selecting, by the terminal device, an Issuer Security Domain Root ISD-R application on the eUICC during an initialization process of the eUICC is specifically:

determining, by the terminal device, whether the eUICC is in a first state, where the first state indicates that there is no enabled profile on the eUICC; and if the eUICC is in the first state, selecting, by the terminal device, the ISD-R application.

Referring to FIG. 2.3 as well, FIG. 2.3 is a schematic diagram of yet another initialization process of an eUICC disclosed in an embodiment of the present invention. FIG. 2.3 is obtained through further optimization on the basis of FIG. 1. Step 2 in FIG. 2.3 is a specific implementation of step 2 in FIG. 1.

Specifically, the terminal device may read a life cycle status LCS byte of the eUICC in an ATR process by using the modem to obtain a status of the eUICC, and determine whether the status is a first state. If the status is the first state, the terminal device may select the ISD-R application by using the modem.

In this optional implementation, during the initialization process of the eUICC, if the terminal device determines that the eUICC is not in the first state, and during the initialization process of the eUICC, the terminal device learns that the card is the eUICC and application information of the ISD-R is preconfigured, the terminal device may select the ISD-R application or may not select the ISD-R application. No limitation is imposed in this embodiment of the present invention. In this optional implementation, a manner of determining the status of the eUICC and selecting the ISD-R application is the same as the foregoing manner.

In yet another optional implementation, a manner of the selecting, by the terminal device, an Issuer Security Domain Root ISD-R application on the eUICC during an initialization process of the eUICC is specifically:

identifying, by the terminal device, a type of a card in the terminal device; and if the type of the card is an eUICC, selecting, by the terminal device, the ISD-R application.

Referring to FIG. 2.4 as well, FIG. 2.4 is a schematic diagram of still yet another initialization process of an eUICC disclosed in an embodiment of the present invention.

FIG. 2.4 is obtained through further optimization on the basis of FIG. 1. Step 2 in FIG. 2.2 is a specific implementation of step 2 in FIG. 1.

Specifically, after the terminal device identifies that a type of a card in the terminal device is an eUICC, the terminal device selects the ISD-R application by using the modem. The application identifier of the ISD-R application can be preconfigured in the modem. Optionally, after the terminal device identifies that the type of the card in the terminal device is an eUICC, the terminal device may further obtain application information on the eUICC. If there is no enabled communications application on the eUICC, the terminal device selects the ISD-R application by using the modem.

After the terminal device selects the ISD-R application on the eUICC by using the modem in the terminal device, application initialization may be performed by the modem in the terminal device, or application initialization may be performed by the LPA in the terminal device.

If the application initialization is performed by the LPA in the terminal device, the following is specifically included.

The terminal device sends a notification message to an application logic function module in the terminal device by using the modem, where the notification message includes information indicating that the ISD-R application is selected. The notification message may further include information indicating that a logical channel used by the ISD-R application is a basic logical channel. The application logic function module may be the LPA in the application layer of the terminal device. During the initialization process of the eUICC, a logical channel selected by the terminal device by default is the basic logical channel.

The terminal device obtains eUICC information by using the application logic function module. The eUICC information includes at least one of eUICC identity information and the profile on the eUICC. The eUICC identity information may be eUICC identifier EID information. The profile on the eUICC may be any enabled or disabled profile on the eUICC.

If the application initialization is performed by the modem in the terminal device, the following is specifically included.

The terminal device obtains eUICC information by using the modem in the terminal device, and sends the eUICC information to the application logic function module in the terminal device. The eUICC information includes at least one of eUICC identity information and a profile on the eUICC.

In still yet another optional implementation, the terminal device reads the application information in the card during the initialization process of the eUICC. If there is no enabled communications application in the card, the terminal device may select no application but maintain the session between the terminal device and the eUICC. The terminal device reads an elementary file directory EFdir on the eUICC by using the modem to obtain the application information. Further, after initialization of the eUICC is completed, the terminal device may send an indication message to the application logic function module (for example, the LPA) in the terminal device by using the modem. The indication message is used to indicate that the eUICC is a valid card, and is used for the application logic function module to perform an operation related to the card.

In a further optional implementation, after initialization of the eUICC ends, the method may further include the following steps:

displaying, by the terminal device, the profile by using the LPA, receiving an instruction that is entered by the user and that is related to the profile, and performing an operation corresponding to the instruction, where the instruction may be an enabling instruction or a disabling instruction.

In the method procedure described in FIG. 2, the terminal device activates the embedded universal integrated circuit card eUICC. Further, the terminal device selects the Issuer Security Domain Root ISD-R application on the eUICC during the initialization process of the eUICC, to maintain the session between the terminal device and the eUICC. It can be learned that in this embodiment of the present invention, during the initialization process of the eUICC, if there is no communications application on the eUICC, the terminal device selects the ISD-R application on the eUICC, so that the modem may consider the eUICC as an invalid card. Therefore, the session between the terminal device and the embedded universal integrated circuit card is maintained.

Figure 3:
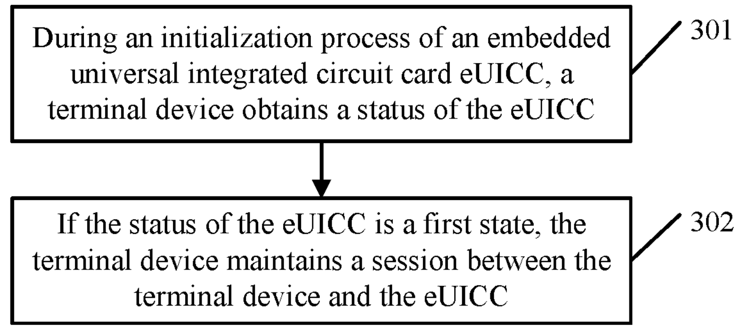
FIG. 3 is a schematic flowchart of another application processing method for an embedded universal integrated circuit card disclosed in an embodiment of the present invention.

Referring to FIG. 3, FIG. 3 is a schematic flowchart of another application processing method for an embedded universal integrated circuit card disclosed in an embodiment of the present invention. The method is applied to a terminal device. As shown in FIG. 3, the method may include the following steps.

301. During an initialization process of an embedded universal integrated circuit card eUICC, the terminal device obtains a status of the eUICC.

In this embodiment of the present invention, when the terminal device is powered on, an activation process of the eUICC is started. During the activation process of the eUICC, the terminal device applies a voltage to the eUICC, and the eUICC returns answer to reset (Answer To Reset, ATR) information to a modem in the terminal device, and performs a required protocol and parameter selection (Protocol and Parameter Selection, PPS) process. The ATR information includes a life cycle status LCS of the eUICC, and the status of the eUICC can be obtained by using the LCS. The status of the eUICC may include three types: an eUICC created state, an eUICC initialized state, and an eUICC operating state.

The eUICC created state means that no profile information is written into the eUICC; in other words, the eUICC is an empty card. The eUICC initialized state means that a profile is downloaded to the eUICC, but the profile is not enabled. The eUICC operating state means that there is enabled profile information on the eUICC.

302. If the status of the eUICC is a first state, the terminal device maintains a session between the terminal device and the eUICC.

In this embodiment of the present invention, the first state indicates that there is no enabled profile on the eUICC, for example, the first state is the eUICC created state or the eUICC initialized state. If the status of the eUICC obtained by the terminal device is the first state, the terminal device selects no application, to maintain the session between the terminal device and the eUICC.

In an optional implementation, if the status of the eUICC is a second state, and the second state indicates that there is an enabled profile on the eUICC, for example, the second state is the eUICC operating state, the terminal device may select a communications application by using the modem in the terminal device. The communications application may include but is not limited to a SIM application, a UIM application, a USIM application, or the like.

In the method procedure described in FIG. 3, if the status of the eUICC indicates that there is no enabled profile on the eUICC, the terminal device can maintain the session between the terminal device and the eUICC. In this way, it can be ensured that the eUICC is a valid card during the initialization process of the eUICC.

Figure 4:
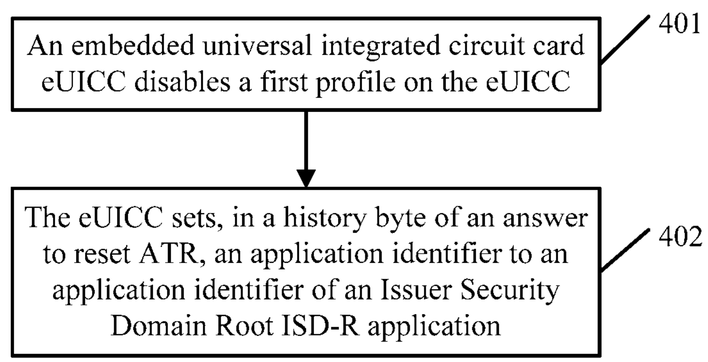
FIG. 4 is a schematic flowchart of still another application processing method for an embedded universal integrated circuit card disclosed in an embodiment of the present invention.

Referring to FIG. 4, FIG. 4 is a schematic flowchart of still another application processing method for an embedded universal integrated circuit card disclosed in an embodiment of the present invention. The method is applied to an embedded universal integrated circuit card eUICC. As shown in FIG. 4, the method may include the following steps.

401. The embedded universal integrated circuit card eUICC disables a first profile on the eUICC.

In this embodiment of the present invention, after the eUICC is delivered, a user may make a contract with a carrier, download a profile of a network of the carrier, and write the profile into the eUICC. The user may download a plurality of profiles. In other words, there may be a plurality of profiles on the eUICC.

Further, the user can enable any profile on the eUICC or disable any enabled profile on the eUICC depending on the user's need. After the user sends a request to enable or disable the profile, the eUICC performs a process of enabling or disabling the profile.

It should be noted that in this embodiment of the present invention, there may be only one enabled profile on the eUICC at a same moment, or there may be a plurality of enabled profiles on the eUICC at a same moment. No limitation is imposed in this embodiment of the present invention. In an optional implementation, when a plurality of enabled profiles exist on the eUICC at the same moment, after step 401, the method may further include the following steps: determining, by the eUICC, whether an enabled profile exists on the eUICC; if no enabled profile exists on the eUICC, performing step 402; or if the enabled profile exists on the eUICC, ending the procedure.

In this optional implementation, after the eUICC disables the first profile on the eUICC, the enabled profile may exist on the eUICC, or no enabled profile exists on the eUICC.

After the eUICC disables the first profile on the eUICC, a manner of the determining, by the eUICC, whether an enabled profile exists on the eUICC may be specifically:

determining, by the eUICC, whether an elementary file directory EFdir exists in a file system of the eUICC, and if no elementary file directory EFdir exists in the file system of the eUICC, determining that no enabled profile exists on the eUICC; or determining, by the eUICC, whether the eUICC is in a first state, and if the eUICC is in the first state, determining that no enabled profile exists on the eUICC, where the first state indicates that there is no enabled profile on the eUICC; or determining, by the eUICC, whether metadata information corresponding to the enabled profile exists on the eUICC, and if no metadata information corresponding to the enabled profile exists on the eUICC, determining that no enabled profile exists on the eUICC.

Usually, after a profile is enabled, the eUICC creates an elementary file directory EFdir in the file system of the eUICC. If the profile is disabled, the eUICC deletes the EFdir corresponding to the profile. Therefore, if the eUICC determines that no elementary file directory EFdir exists in the file system of the eUICC, it may be determined that no enabled profile exists on the eUICC.

In addition, a life cycle status LCS on the eUICC may reflect a real-time status of the eUICC, for example, an eUICC created state, an eUICC initialized state, or an eUICC operating state. If the eUICC determines that the eUICC is in the first state, it may be determined that no enabled profile exists on the eUICC, where the first state indicates that there is no enabled profile on the eUICC.

When a profile is downloaded or installed on the eUICC, metadata information corresponding to the profile is generated accordingly, where the metadata information may include a profile identifier, a profile name, information about a carrier to which the profile belongs, status information of the profile, and the like. Specifically, the eUICC may read metadata information on the eUICC and determine, based on the metadata information, whether an enabled profile exists on the eUICC. If no enabled profile exists on the eUICC, it may be determined that no enabled profile exists on the eUICC.

402. The eUICC sets, in a historical byte of an answer to reset ATR, an application identifier to an application identifier of an Issuer Security Domain Root ISD-R application.

In this embodiment of the present invention, after the eUICC disables the first profile on the eUICC, the eUICC needs to set, in the historical byte of the answer to reset ATR, the application identifier to the application identifier of the Issuer Security Domain Root ISD-R application. The application identifier of the ISD-R application is used by the terminal device in which the eUICC is located to implicitly select the ISD-R application based on the application identifier of the ISD-R application during an initialization process of the eUICC, to maintain a session between the terminal device and the eUICC. In this way, the eUICC is a valid card during the initialization process of the eUICC.

In another optional implementation, after step 402, the method may further include the following steps:

(11) The eUICC enables a second profile on the eUICC.

(12) The eUICC deletes the application identifier of the ISD-R application that is set in the historical byte of the ATR.

Optionally, after step (11), the method may further include the following step:

(13) The eUICC adds the application identifier of the ISD-R application to an elementary file directory EFdir of the eUICC.

In this optional implementation, the user can enable or disable the profile on the eUICC depending on the user's need. Therefore, after the eUICC disables the first profile on the eUICC, if the eUICC receives an enabling instruction of the user, the eUICC needs to enable the second profile on the eUICC, where the second profile and the first profile may be a same profile, or may be different profiles. The second profile enabled in step (11) is a profile first enabled on the eUICC.

After the eUICC enables the second profile on the eUICC, a communications application corresponding to the second profile exists on the eUICC. In a next initialization process of the eUICC, the eUICC may directly select the communications application corresponding to the second profile without selecting the ISD-R application. Therefore, after the eUICC enables the second profile on the eUICC, the eUICC needs to delete the application identifier of the ISD-R application that is set in the historical byte of the ATR.

Usually, the terminal device selects an application by reading application information of the EFdir. Therefore, after the eUICC enables the second profile on the eUICC, the eUICC further needs to add the application identifier of the ISD-R application to the EFdir of the eUICC, so that subsequently, before selecting the ISD-R application, the terminal device needs to read the EFdir to obtain the identifier of the ISD-R application.

In the method procedure described in FIG. 4, the embedded universal integrated circuit card eUICC disables the first profile on the eUICC, and sets, in the historical byte of the answer to reset ATR, the application identifier to the application identifier of the Issuer Security Domain Root ISD-R application. In this way, during the initialization process of the eUICC, the terminal device in which the eUICC is located may select the ISD-R application based on the application identifier of the ISD-R application, to maintain the session between the terminal device and the eUICC.

Figure 5:
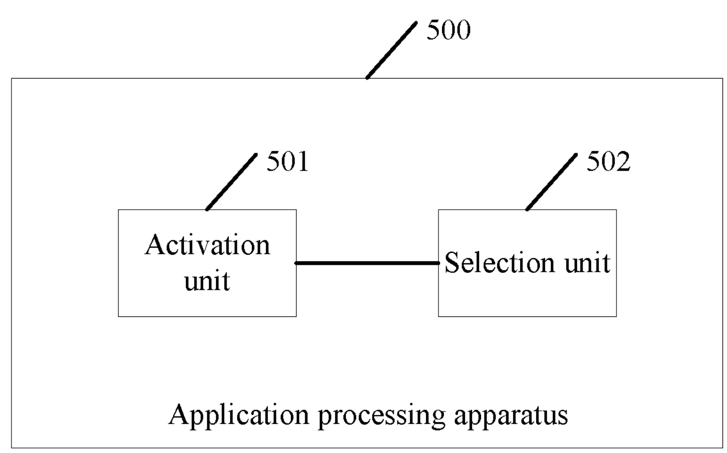
FIG. 5 is a schematic structural diagram of an application processing apparatus disclosed in an embodiment of the present invention.

Referring to FIG. 5, FIG. 5 is a schematic structural diagram of an application processing apparatus disclosed in an embodiment of the present invention. The application processing apparatus shown in FIG. 5 may be configured to perform some or all steps in the application processing method for an embedded universal integrated circuit card described in FIG. 2. For details, refer to related description in FIG. 2. Details are not described herein again. The application processing apparatus shown in FIG. 5 is applied to a terminal device. The application processing apparatus 500 may include:

an activation unit 501, configured to activate an embedded universal integrated circuit card eUICC; and a selection unit 502, configured to select an Issuer Security Domain Root ISD-R application on the eUICC during an initialization process of the eUICC, to maintain a session between the terminal device and the eUICC.

Optionally, a manner in which a selection unit 502 selects an Issuer Security Domain Root ISD-R application on the eUICC during an initialization process of the eUICC is specifically:

selecting the ISD-R application on the eUICC by using a modem in the terminal device during the initialization process of the eUICC.

Figure 6:
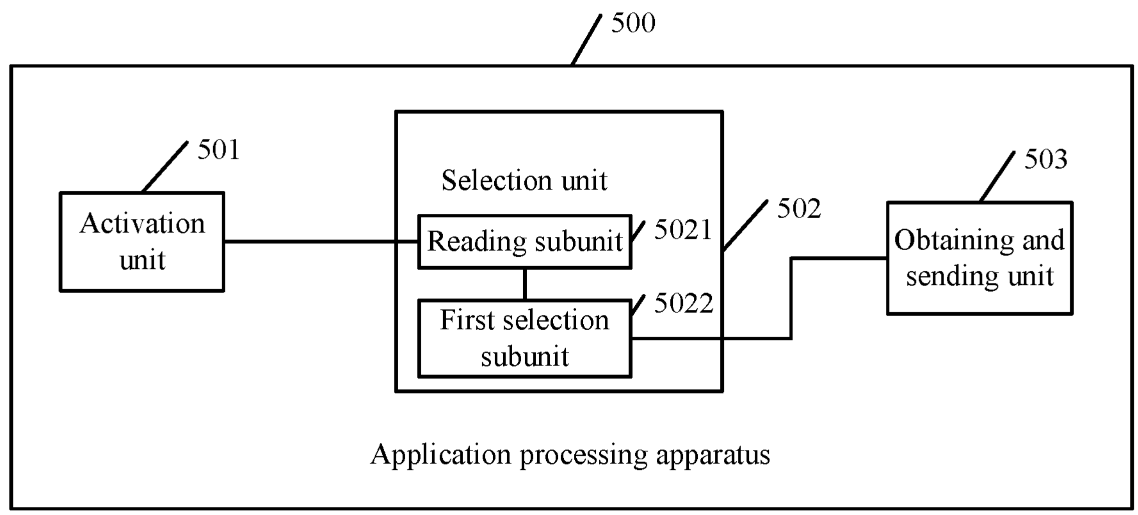
FIG. 6 is a schematic structural diagram of another application processing apparatus disclosed in an embodiment of the present invention.

Referring to FIG. 6, FIG. 6 is a schematic structural diagram of another application processing apparatus disclosed in an embodiment of the present invention. The application processing apparatus shown in FIG. 6 may be configured to perform some or all steps in the application processing method for an embedded universal integrated circuit card described in FIG. 2. For details, refer to related description in FIG. 2. Details are not described herein again. The application processing apparatus shown in FIG. 6 is applied to a terminal device. The application processing apparatus shown in FIG. 6 is obtained through further optimization on the basis of the application processing apparatus shown in FIG. 5. Compared with the application processing apparatus shown in FIG. 5, the application processing apparatus shown in FIG. 6 includes all units of the application processing apparatus shown in FIG. 5, and in addition, the selection unit 502 may include:

a reading subunit 5021, configured to read, during the initialization process of the eUICC, an application identifier that is set by the eUICC in a historical byte of an answer to reset ATR; and a first selection subunit 5022, configured to: if the application identifier is an application identifier of the ISD-R application, implicitly select the ISD-R application based on the application identifier of the ISD-R application.

Optionally, the application processing apparatus 500 shown in FIG. 6 may further include:

an obtaining and sending unit 503, configured to: obtain eUICC information by using a modem in the terminal device, and send the eUICC information to an application logic function module in the terminal device, where the eUICC information includes at least one of eUICC identity information, a profile on the eUICC, and eUICC capability information.

Figure 7:
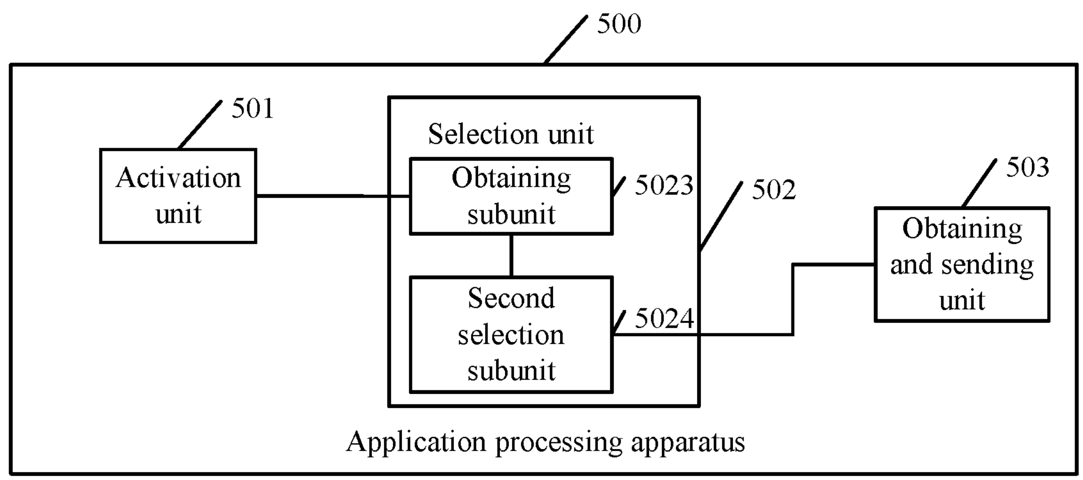
FIG. 7 is a schematic structural diagram of still another application processing apparatus disclosed in an embodiment of the present invention.

Referring to FIG. 7, FIG. 7 is a schematic structural diagram of still another application processing apparatus disclosed in an embodiment of the present invention. The application processing apparatus shown in FIG. 7 may be configured to perform some or all steps in the application processing method for an embedded universal integrated circuit card described in FIG. 2. For details, refer to related description in FIG. 2. Details are not described herein again. The application processing apparatus shown in FIG. 7 is applied to a terminal device. The application processing apparatus shown in FIG. 7 is obtained through further optimization on the basis of the application processing apparatus shown in FIG. 5. Compared with the application processing apparatus shown in FIG. 5, the application processing apparatus shown in FIG. 7 includes all units of the application processing apparatus shown in FIG. 5, and in addition, the selection unit 502 may include:

an obtaining subunit 5023, configured to obtain application information on the eUICC during the initialization process of the eUICC; and a second selection subunit 5024, configured to: if there is no enabled communications application on the eUICC, explicitly select the ISD-R application, where the communications application is an application used to access a carrier network.

Optionally, the application processing apparatus 500 shown in FIG. 7 may further include:

an obtaining and sending unit 503, configured to: obtain eUICC information by using a modem in the terminal device, and send the eUICC information to an application logic function module in the terminal device, where the eUICC information includes at least one of eUICC identity information, a profile on the eUICC, and eUICC capability information.

Figure 8:
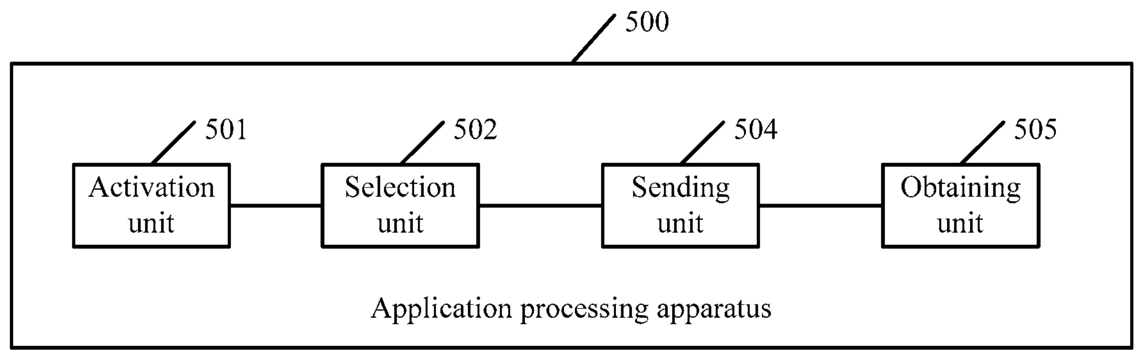
FIG. 8 is a schematic structural diagram of yet another application processing apparatus disclosed in an embodiment of the present invention.

Referring to FIG. 8, FIG. 8 is a schematic structural diagram of yet another application processing apparatus disclosed in an embodiment of the present invention. The application processing apparatus shown in FIG. 8 may be configured to perform some or all steps in the application processing method for an embedded universal integrated circuit card described in FIG. 2. For details, refer to related description in FIG. 2. Details are not described herein again. The application processing apparatus shown in FIG. 8 is applied to a terminal device. The application processing apparatus shown in FIG. 8 is obtained through further optimization on the basis of the application processing apparatus shown in FIG. 5. Compared with the application processing apparatus shown in FIG. 5, in addition to all units of the application processing apparatus shown in FIG. 5, the application processing apparatus shown in FIG. 8 may further include:

a sending unit 504, configured to send a notification message to an application logic function module in the terminal device by using the modem, where the notification message includes information indicating that the ISD-R application is selected.

The notification message further includes information indicating that a logical channel used by the ISD-R application is a basic logical channel.

Optionally, the application processing apparatus 500 shown in FIG. 8 may further include:

an obtaining unit 505, configured to obtain eUICC information by using the application logic function module, where the eUICC information includes at least one of eUICC identity information, a profile on the eUICC, and eUICC capability information.

Figure 9:
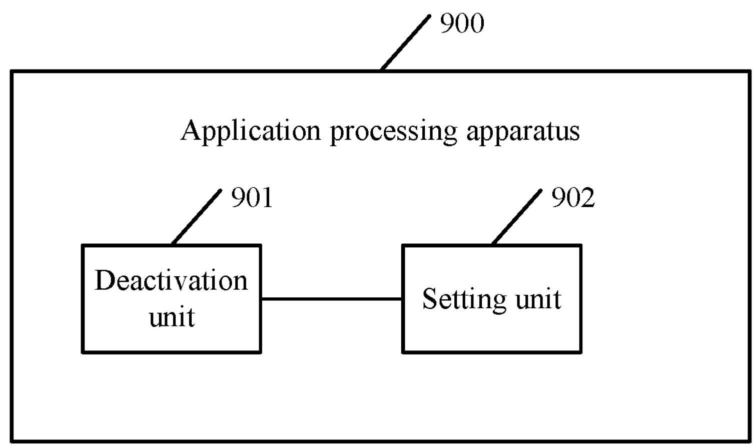
FIG. 9 is a schematic structural diagram of still yet another application processing apparatus disclosed in an embodiment of the present invention.

Referring to FIG. 9, FIG. 9 is a schematic structural diagram of still yet another application processing apparatus disclosed in an embodiment of the present invention. The application processing apparatus shown in FIG. 9 may be configured to perform some or all steps in the application processing method for an embedded universal integrated circuit card described in FIG. 4. For details, refer to related description in FIG. 4. Details are not described herein again. The application processing apparatus shown in FIG. 9 is applied to an embedded universal integrated circuit card eUICC. The application processing apparatus 900 may include:

a deactivation unit 901, configured to disable a first profile on the eUICC; and a setting unit 902, configured to set, in a historical byte of an answer to reset ATR, an application identifier to an application identifier of an Issuer Security Domain Root ISD-R application, where the application identifier of the ISD-R application is used by a terminal device in which the eUICC is located to select the ISD-R application based on the application identifier of the ISD-R application during an initialization process of the eUICC, to maintain a session between the terminal device and the eUICC.

Figure 10:
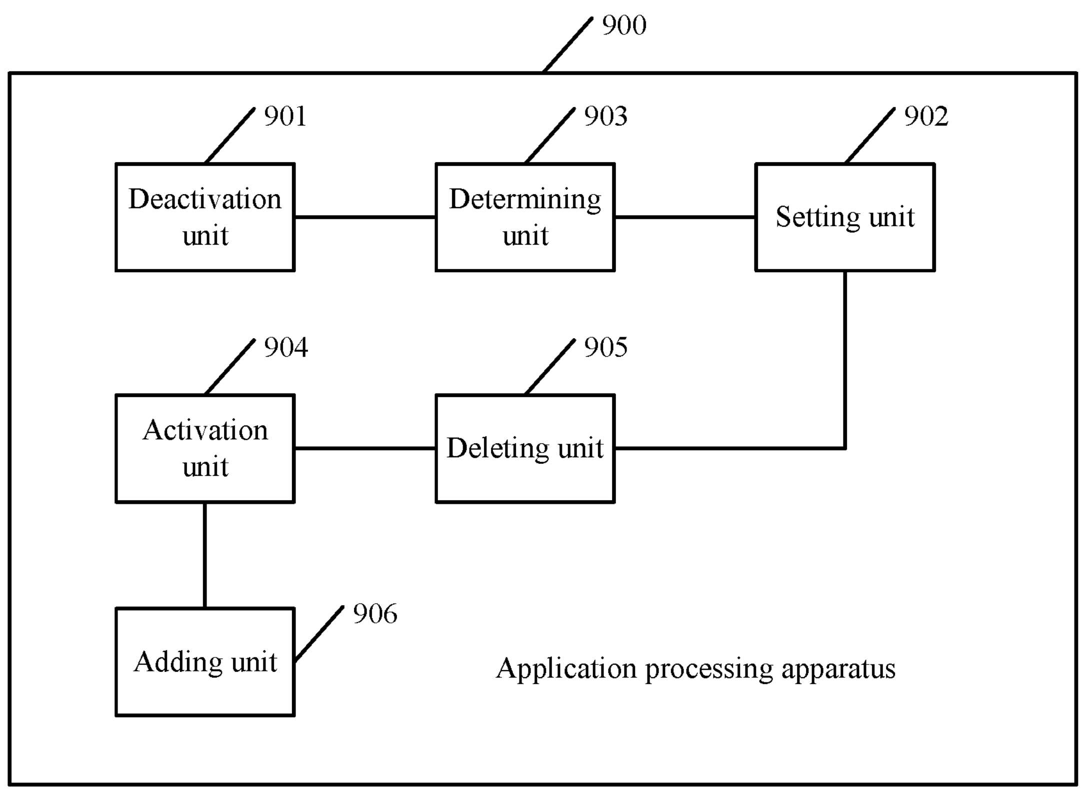
FIG. 10 is a schematic structural diagram of a further application processing apparatus disclosed in an embodiment of the present invention.

Referring to FIG. 10, FIG. 10 is a schematic structural diagram of a further application processing apparatus disclosed in an embodiment of the present invention. The application processing apparatus shown in FIG. 10 may be configured to perform some or all steps in the application processing method for an embedded universal integrated circuit card described in FIG. 4. For details, refer to related description in FIG. 4. Details are not described herein again. The application processing apparatus shown in FIG. 10 is applied to an embedded universal integrated circuit card eUICC. The application processing apparatus shown in FIG. 10 is obtained through further optimization on the basis of the application processing apparatus shown in FIG. 9. Compared with the application processing apparatus shown in FIG. 9, in addition to all units of the application processing apparatus shown in FIG. 9, the application processing apparatus shown in FIG. 10 may further include:

a determining unit 903, configured to determine whether an enabled profile exists on the eUICC.

The setting unit 902 is specifically configured to: when the determining unit 903 determines that no enabled profile exists on the eUICC, set, in a historical byte of an answer to reset ATR, an application identifier to an application identifier of an Issuer Security Domain Root ISD-R application.

Optionally, a manner in which a determining unit 903 determines whether an enabled profile exists on the eUICC is specifically:

determining whether an elementary file directory EFdir exists in a file system of the eUICC, and if no elementary file directory EFdir exists in the file system of the eUICC, determining that no enabled profile exists on the eUICC; or determining whether the eUICC is in a first state, and if the eUICC is in the first state, determining that no enabled profile exists on the eUICC, where the first state indicates that there is no enabled profile on the eUICC; or determining whether metadata information corresponding to the enabled profile exists on the eUICC, and if no metadata information corresponding to the enabled profile exists on the eUICC, determining that no enabled profile exists on the eUICC.

Optionally, the application processing apparatus 900 shown in FIG. 10 may further include:

an activation unit 904, configured to enable a second profile on the eUICC; and a deleting unit 905, configured to delete the application identifier of the ISD-R application that is set in the historical byte of the ATR.

Optionally, if the activation unit 904 enables the second profile on the eUICC, the application processing apparatus 900 shown in FIG. 10 may further include:

an adding unit 906, configured to add the application identifier of the ISD-R application to the elementary file directory EFdir of the eUICC.

Figure 11:
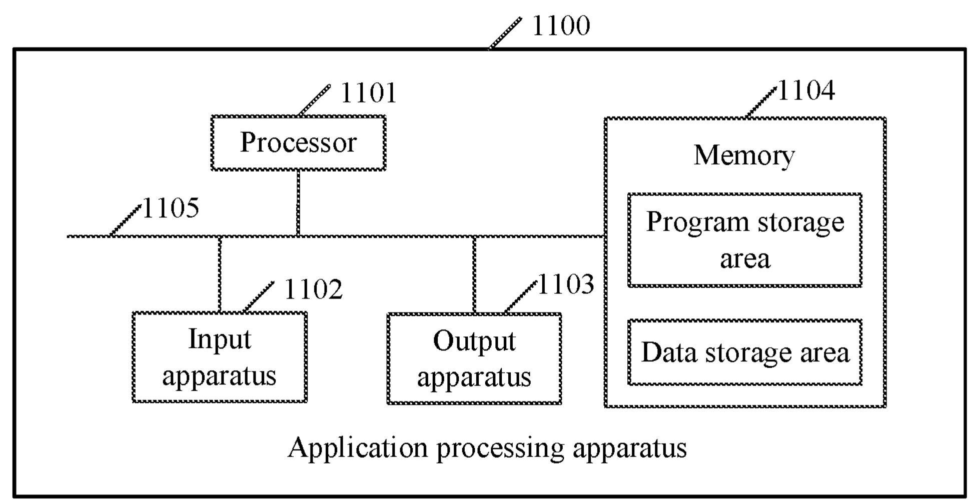
FIG. 11 is a schematic structural diagram of a still further application processing apparatus disclosed in an embodiment of the present invention.

Referring to FIG. 11, FIG. 11 is a schematic structural diagram of a still further application processing apparatus disclosed in an embodiment of the present invention. The application processing apparatus shown in FIG. 11 is applied to a terminal device. The application processing apparatus may be configured to perform some or all steps in the application processing method for an embedded universal integrated circuit card disclosed in FIG. 2. For details, refer to related description in FIG. 2. Details are not described herein again. As shown in FIG. 11, the application processing apparatus 1100 may include: at least one processor 1101, for example, a CPU (Central Processing Unit, central processing unit), at least one input apparatus 1102, at least one output apparatus 1103, a memory 1104, and a communications bus 1105. The communications bus 1105 is configured to implement communication connection between these components. A person skilled in the art can understand that a structure of the application processing apparatus 1100 shown in FIG. 11 does not constitute a limitation to the present invention. The structure may be a bus-shaped structure or a star-shaped structure, or may include more or fewer components than those shown in FIG. 11, or may be a combination of some components or an arrangement of different components.

The processor 1101 is a control center of a terminal, and uses various interfaces and lines to connect parts of the entire terminal; and runs or executes program code and/or a module stored in the memory 1104 and invokes data stored in the memory 1104, to perform various functions of the terminal and/or process data. The processor unit may include an integrated circuit (Integrated Circuit, IC for short), for example, include a single packaged IC or include a plurality of packaged ICs that have a same function or different functions. For example, the processor 1101 may include only a central processing unit (Central Processing Unit, CPU for short), or may be a combination of a CPU, a digital signal processor (digital signal processor, DSP for short), a graphics processing unit (Graphic Processing Unit, GPU for short), and a control chip (for example, a baseband chip) in a communications unit. In this embodiment of the present invention, the CPU may be a single computing core or may include a plurality of computing cores.

The input apparatus 1102 is configured to implement interaction between a user and the terminal and/or input information into the terminal. For example, the input apparatus 1102 may receive digital or character information entered by the user, to generate signal input related to user settings or function control. In a specific implementation of the present invention, the input apparatus 1102 may be a touch panel, or may be another human-computer interaction interface, for example, a substantive input key or a microphone, or may be another external information capture apparatus, for example, a camera. The touch panel, also referred to as a touchscreen or a touch screen, can collect an operation action of touching or approaching the touch panel by the user, for example, an operation action on the touch panel or at a location close to the touch panel by the user by using any proper object or accessory such as a finger or a stylus, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and sends the contact coordinates to the processor 1101. The touch controller may further receive and execute a command sent by the processor 1101. In addition, the touch panel can be implemented by using a plurality of types such as a resistive type, a capacitive type, an infrared (Infrared) type, or a surface acoustic wave type. In another implementation of the present invention, the substantive input key used by the input apparatus 1102 may include but is not limited to one or more of a physical keyboard, a function key (for example, a volume button or a power button), a trackball, a mouse, a joystick, and the like. An input unit in a form of a microphone can collect voice that is input from a user or an environment, and convert the voice into a command that is in a form of an electrical signal and that can be executed by the processor 1101.

The output apparatus 1103 may include but is not limited to an image output unit, a sound output unit, and a touch output unit. The image output unit is configured to output text, a picture, and/or a video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output unit may include a reflective display, for example, an electrophoretic (electrophoretic) display, or a display that uses interferometric modulation of light (Interferometric Modulation of Light). The image output unit may include a single display or a plurality of displays of different sizes. In a specific implementation of the present invention, the touch panel used in the foregoing input apparatus 1102 may also serve as a display panel of the output apparatus 1103 at the same time. For example, after detecting a gesture operation of touching or approaching the touch panel, the touch panel transmits the gesture operation to the processor 1101 to determine a type of a touch event, and then the processor 1101 provides corresponding visual output on the display panel based on the type of the touch event. Although in FIG. 11, the input apparatus 1102 and the output apparatus 1103 serve as two independent components to implement input and output functions of the terminal device, in some embodiments, the touch panel and the display panel may be integrated to implement the input and output functions of the terminal. For example, the image output unit may display various graphical user interfaces (Graphical User Interface, GUI for short) as virtual control components, including but not limited to a window, a scroll bar, an icon, and a scrapbook, for the user to perform an operation in a touch manner.

The memory 1104 is configured to store a software program and a module. The processor 1101 runs the software program and the module stored in the memory 1104 to execute various function applications of a user terminal and implement data processing. The memory 1104 mainly includes a program storage area and a data storage area. The program storage area may store an operating system, an application program required by at least one function, such as a sound play program or an image play program, and the like. The data storage area may store data (such as audio data or an address book) created based on use of an electronic device, and the like. In a specific implementation of the present invention, the memory 1104 may include a volatile memory, for example, a nonvolatile dynamic random access memory (Nonvolatile Random Access Memory, NVRAM for short), a phase change random access memory (Phase Change RAM, PRAM for short), or a magnetoresistive random access memory (Magnetoresistive RAM, MRAM for short), or may include a nonvolatile memory, for example, at least one magnetic disk storage device, an electrically erasable programmable read-only memory (Electrically Erasable Programmable Read-Only Memory, EEPROM for short), or a flash memory device such as a NOR flash memory (NOR flash memory) or a NAND flash memory (NAND flash memory). The foregoing application program includes any application installed on the user terminal, including but not limited to a browser, an email, an instant message service, word processing, keyboard virtualization, a widget (widget), encryption, digital copyright management, voice recognition, voice reproduction, positioning (for example, a function provided by a global positioning system), music play, or the like.

In the application processing apparatus 1100 shown in FIG. 11, the processor 1101 runs or executes the software program and/or the module stored in the memory 1104 and invokes program code stored in the memory 1104, to perform the following operations:

activating an embedded universal integrated circuit card eUICC; and selecting an Issuer Security Domain Root ISD-R application on the eUICC during an initialization process of the eUICC, to maintain a session between the terminal device and the eUICC.

Optionally, a manner in which the processor 1101 selects an Issuer Security Domain Root ISD-R application on the eUICC during an initialization process of the eUICC is specifically:

reading, during the initialization process of the eUICC, an application identifier that is set by the eUICC in a historical byte of an answer to reset ATR; and if the application identifier is an application identifier of the ISD-R application, implicitly selecting the ISD-R application based on the application identifier of the ISD-R application.

The application identifier of the ISD-R application that is set by the eUICC in the historical byte of the ATR is set after the eUICC disables a profile on the eUICC, where the profile is information used to access a carrier network.

Optionally, a manner in which the processor 1101 selects an Issuer Security Domain Root ISD-R application on the eUICC during an initialization process of the eUICC is specifically:

controlling the input apparatus 1102 to obtain application information on the eUICC during the initialization process of the eUICC; and if there is no enabled communications application on the eUICC, explicitly selecting the ISD-R application, where the communications application is an application used to access a carrier network.

Optionally, a manner in which the processor 1101 selects an Issuer Security Domain Root ISD-R application on the eUICC during an initialization process of the eUICC is specifically:

selecting the ISD-R application on the eUICC by using a modem in the terminal device during the initialization process of the eUICC.

Optionally, the processor 1101 is further configured to invoke the program code stored in the memory 1104 to perform the following step:

controlling the output apparatus 1103 to send a notification message to an application logic function module in the terminal device by using the modem, where the notification message includes information indicating that the ISD-R application is selected.

The notification message further includes information indicating that a logical channel used by the ISD-R application is a basic logical channel.

Optionally, the processor 1101 is further configured to invoke the program code stored in the memory to perform the following step:

controlling the input apparatus 1102 to obtain eUICC information by using the application logic function module, where the eUICC information includes at least one of eUICC identity information, a profile on the eUICC, and eUICC capability information.

The processor is further configured to invoke the program code stored in the memory to perform the following step:

controlling the input apparatus 1102 to obtain eUICC information by using the modem in the terminal device, and controlling the output apparatus 1103 to send the eUICC information to an application logic function module in the terminal device, where the eUICC information includes at least one of eUICC identity information, a profile on the eUICC, and eUICC capability information.

Figure 12:
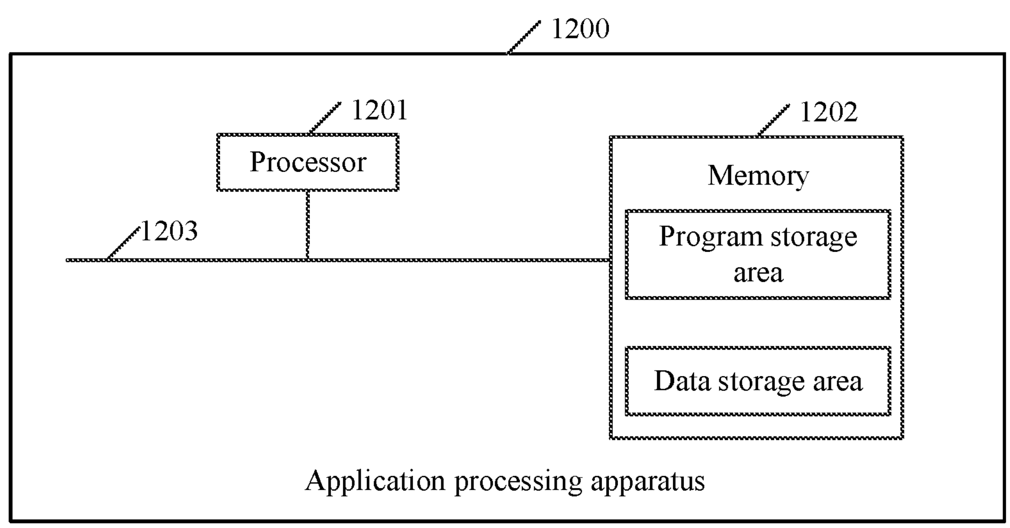
FIG. 12 is a schematic structural diagram of a yet further application processing apparatus disclosed in an embodiment of the present invention.

Referring to FIG. 12, FIG. 12 is a schematic structural diagram of a yet further application processing apparatus disclosed in an embodiment of the present invention. The application processing apparatus shown in FIG. 12 is applied to an embedded universal integrated circuit card eUICC. The application processing apparatus may be configured to perform some or all steps in the application processing method for an embedded universal integrated circuit card disclosed in FIG. 4. For details, refer to related description in FIG. 4. Details are not described herein again. As shown in FIG. 12, the application processing apparatus 1200 may include: at least one processor 1201, for example, a CPU (Central Processing Unit, central processing unit), a memory 1202, and a communications bus 1203. The communications bus 1203 is configured to implement communication connection between these components. The memory 1202 may be a high-speed RAM memory or a nonvolatile memory (non-volatile memory). A person skilled in the art can understand that a structure of the application processing apparatus 1200 shown in FIG. 12 does not constitute a limitation to the present invention. The structure may be a bus-shaped structure or a star-shaped structure, or may include more or fewer components than those shown in FIG. 12, or may be a combination of some components or an arrangement of different components.

The processor 1201 is a control center of the application processing apparatus 1200, and may be a central processing unit (Central Processing Unit, CPU). The processor 1201 uses various interfaces and lines to connect parts of the entire application processing apparatus 1200, and runs or executes a software program and/or a module stored in the memory 1202 and invokes procedure code stored in the memory 1202 to perform the following steps:

disabling a first profile on the eUICC; and setting, in a historical byte of an answer to reset ATR, an application identifier to an application identifier of an Issuer Security Domain Root ISD-R application, where the application identifier of the ISD-R application is used by a terminal device in which the eUICC is located to select the ISD-R application based on the application identifier of the ISD-R application during an initialization process of the eUICC, to maintain a session between the terminal device and the eUICC.

Optionally, after the processor 1201 disables the first profile on the eUICC, the processor is further configured to invoke the program code stored in the memory to perform the following steps:

determining whether an enabled profile exists on the eUICC; and if no enabled profile exists on the eUICC, performing the step of setting, in a historical byte of an answer to reset ATR, an application identifier to an application identifier of an Issuer Security Domain Root ISD-R application.

Optionally, a manner in which the processor 1201 determines whether an enabled profile exists on the eUICC is specifically:

determining whether an elementary file directory EFdir exists in a file system of the eUICC, and if no elementary file directory EFdir exists in the file system of the eUICC, determining that no enabled profile exists on the eUICC; or determining whether the eUICC is in a first state, and if the eUICC is in the first state, determining that no enabled profile exists on the eUICC, where the first state indicates that there is no enabled profile on the eUICC; or determining whether metadata information corresponding to the enabled profile exists on the eUICC, and if no metadata information corresponding to the enabled profile exists on the eUICC, determining that no enabled profile exists on the eUICC.

Optionally, the processor 1201 is further configured to invoke the program code stored in the memory to perform the following steps:

enabling a second profile on the eUICC; and deleting the application identifier of the ISD-R application that is set in the historical byte of the ATR.

Optionally, the processor 1201 is further configured to invoke the program code stored in the memory to perform the following step:

adding the application identifier of the ISD-R application to the elementary file directory EFdir of the eUICC.

Figure 13:
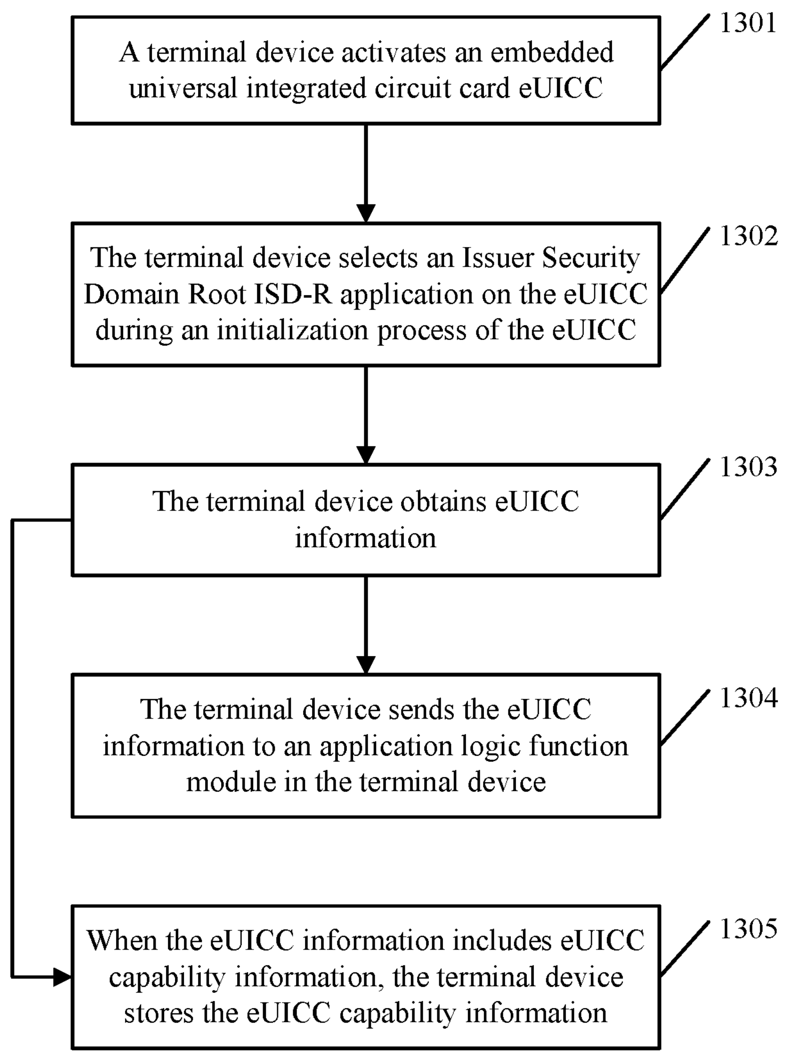
FIG. 13 is a schematic flowchart of yet another application processing method for an embedded universal integrated circuit card disclosed in an embodiment of the present invention.

Referring to FIG. 13, FIG. 13 is a schematic flowchart of yet another application processing method for an embedded universal integrated circuit card disclosed in an embodiment of the present invention. As shown in FIG. 13, the method includes the following steps.

1301. A terminal device activates an embedded universal integrated circuit card eUICC.

1302. The terminal device selects an Issuer Security Domain Root ISD-R application on the eUICC during an initialization process of the eUICC.

Optionally, a logical channel used by the ISD-R application is a basic logical channel.

1303. The terminal device obtains eUICC information.

After step 1303 is performed, step 1304 or 1305 may be further performed.

1304. The terminal device sends the eUICC information to an application logic function module in the terminal device.

1305. When the eUICC information includes eUICC capability information, the terminal device stores the eUICC capability information.

In this embodiment of the present invention, the terminal device selects the ISD-R application on the eUICC by using a modem in the terminal device during the initialization process of the eUICC, and after the ISD-R application is selected, the modem in the terminal device performs initialization. The performing, by the modem, initialization may specifically include: obtaining the eUICC information by the modem, and sending the eUICC information to the application logic function module in the terminal device.

The obtaining, by the terminal device, eUICC may be: receiving, by the terminal device, the eUICC information from the eUICC, or requesting, by the terminal device, the eUICC information from the eUICC. No limitation is imposed in this embodiment of the present invention.

The application logic function module may be a local profile assistant LPA in an application layer of the terminal device, or may be an application logic function module that is on the terminal and that communicates with an LPAe (LPAe is short for an LPA on the eUICC).

The eUICC information includes at least one of eUICC identity information, information about a profile on the eUICC, and eUICC capability information.

Specifically, the subscription information on the eUICC includes:

at least one of information about all profiles on the eUICC, information about an enabled profile on the eUICC, information about a disabled profile on the eUICC, information about a preconfigured-type profile on the eUICC, information about a test-type profile on the eUICC, information indicating that there is no operable profile on the eUICC, and information indicating that there is no enabled profile on the eUICC.

The information about the profile on the eUICC may include one or more of an identifier of the profile on the eUICC, a status of each profile, a type of the profile, and information about a carrier or a service provider to which the profile belongs. The status of the profile may be an enabled state or a disabled state. The type of the profile may include any one of an operable type, a test type, and a preconfigured type.

The information about the enabled profile on the eUICC may include an identifier of the enabled profile and/or a type of the profile. The type of the profile is any one of an operable type, a test type, and a preconfigured type.

The information about the disabled profile on the eUICC may include an identifier of the disabled profile and/or a type of the profile. The type of the profile includes any one of an operable type, a test type, and a preconfigured type.

The information about the preconfigured-type profile on the eUICC may specifically include an identifier of the preconfigured-type profile.

The information about the test-type profile on the eUICC may specifically include an identifier of the test-type profile.

Specifically, the eUICC capability information includes one or more of the following information:

a protocol version number supported by the eUICC, an identifier of a key supported by the eUICC, a category of the eUICC, and capability information of an LPA supported by the eUICC (the LPA on the eUICC is referred to as an LPAe, and the capability information of an LPA supported by the eUICC is a mode of communication between the LPAe supported by the eUICC and the terminal device).

After the application logic function module (for example, the LPA) of the terminal device obtains the eUICC information, the following steps may be performed:

initiating, by the application logic function module (for example, the LPA), a service discovery process based on the information indicating that there is no operable profile on the eUICC, that is, requesting, by the application logic function module (for example, the LPA), a carrier server to download, for the eUICC, a profile corresponding to the eUICC; or prompting, by the application logic function module (for example, the LPA) based on the information indicating that there is no enabled profile on the eUICC, a user with the information indicating that there is no enabled profile on the eUICC; or displaying, by the application logic function module (for example, the LPA) to the user based on the information about the disabled profile on the eUICC, the profile in the disabled state on the eUICC, so that the user enables an operable profile that is in the disabled state on a current eUICC; or when the user subsequently operates the application logic function module (for example, the LPA) to perform an operation related to a profile, determining, by the application logic function module (for example, the LPA), that the terminal device currently has no network connection, and enabling, by the application logic function module (for example, the LPA), the preconfigured-type profile based on the information about the preconfigured-type profile, to provide the terminal device with a network connection provided for a preconfigured-type subscription; or when the application logic function module (for example, the LPA) operates the eUICC to enter a test mode, displaying, by the application logic function module (for example, the LPA) to the user, the test-type profile based on the information about the test-type profile, so that the user enables the test-type profile to test the eUICC; or after the eUICC capability information is obtained, determining, by the application logic function module (for example, the LPA) based on the protocol version number supported by the eUICC, a protocol version number used when the LPA subsequently performs an operation with the eUICC.

After the terminal device obtains, by using the modem, the capability information of the LPA supported by the eUICC, the terminal device sends, by using the modem, the capability information of the LPA supported by the eUICC to the application logic function module in the terminal device. The application logic function module herein may be a module communicating with the LPAe, or may be the LPA in the terminal device. No limitation is imposed in this patent. When the application logic function module needs to activate the LPAe, the application logic function module determines whether capability information of an LPAe supported by the terminal device matches capability information of the LPAe supported by the eUICC, to determine whether the LPAe can be activated. In an optional implementation, after the terminal device receives, by using the modem, the capability information of the LPA supported by the eUICC, the modem determines whether capability of the LPAe supported by the terminal matches capability of the LPAe supported by the eUICC. If the capability of the LPAe supported by the terminal does not match the capability of the LPAe supported by the eUICC, the modem may send a notification message to the application logic function module in the terminal, to notify the application logic function module that the LPAe cannot be activated. Therefore, when the module subsequently activates the LPAe, the module determines, based on information in the received notification message, that the LPAe cannot be activated. In another optional implementation, in step 1304, after the terminal device receives, by using the modem, the capability information of the LPA supported by the eUICC, the modem may send the capability information of the LPA supported by the eUICC to the LPA on the terminal device, so that the LPA on the terminal device determines, based on the information, whether to activate the LPAe.

In step 1304, after the terminal device obtains the eUICC information by using the modem, the terminal device may store the eUICC information by using the modem or may not store the eUICC. No limitation is imposed in this specification.

In step 1305, after the terminal device receives, by using the modem, the capability information of the LPA supported by the eUICC, the modem stores the capability information of the LPA supported by the eUICC. The capability information of the LPA supported by the eUICC is used to determine, by the modem based on the stored capability information of the LPA supported by the eUICC when the terminal device subsequently activates the LPAe, whether the eUICC supports a communication mode of the LPAe supported by the terminal device. If the eUICC does not support the communication mode of the LPAe supported by the terminal device, activating the LPAe by the terminal device is rejected.

Figure 14:
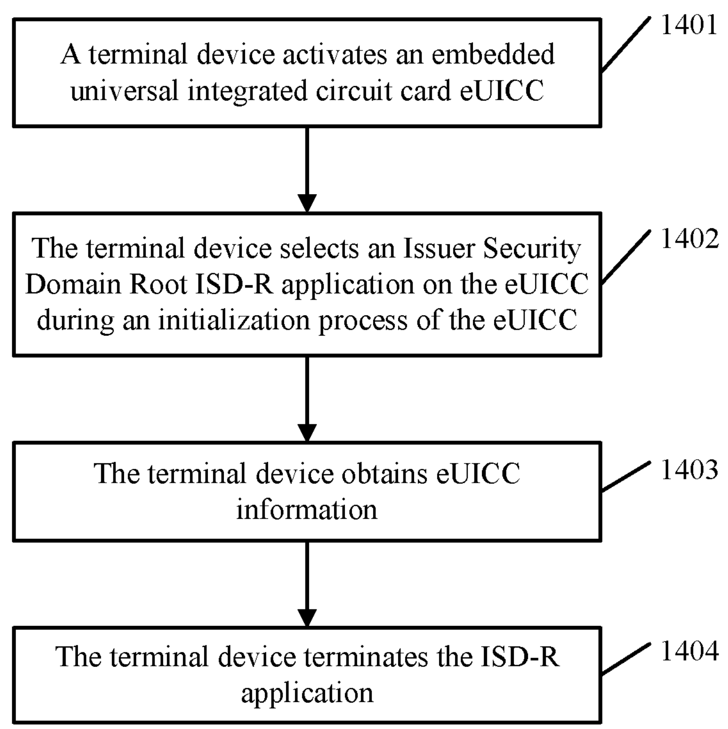
FIG. 14 is a schematic flowchart of still yet another application processing method for an embedded universal integrated circuit card disclosed in an embodiment of the present invention.

Referring to FIG. 14, FIG. 14 is a schematic flowchart of still yet another application processing method for an embedded universal integrated circuit card disclosed in an embodiment of the present invention. As shown in FIG. 14, the method includes the following steps:

1401. A terminal device activates an embedded universal integrated circuit card eUICC.

1402. The terminal device selects an Issuer Security Domain Root ISD-R application on the eUICC during an initialization process of the eUICC.

1403. The terminal device obtains eUICC information.

1404. The terminal device terminates the ISD-R application.

In this embodiment of the present invention, the terminal device may terminate the ISD-R application in the following manners:

(1) When initialization of the eUICC is completed, the terminal device terminates the selected ISD-R application by using a modem.

(2) A timer is set in a modem of the terminal device. After the terminal device selects the Issuer Security Domain Root ISD-R application on the eUICC, the terminal device starts the timer by using the modem. After the timer expires, the terminal device terminates the selected ISD-R application by using the modem.

(3) After initialization of the eUICC is completed, and after an LPA subsequently creates a logical channel and initiates an ISD-R selection operation, the terminal device receives an ISD-R selection instruction by using a modem, and the modem of the terminal device terminates the selected ISD-R, and uses the logical channel newly created by the LPA to execute the received ISD-R application selection instruction.

(4) During the initialization process of the eUICC described above, after selecting the ISD-R by using a modem, the terminal device may obtain the eUICC information and send the eUICC information to an application logic function module. After receiving the eUICC information that is sent by the terminal device by using the modem, the application logic function module returns a response message. After receiving the response message, the modem terminates the ISD-R application.

The steps in the method embodiments shown in FIG. 13 and FIG. 14 are performed by an application processing apparatus of a mobile terminal. For a structure of the application processing apparatus, refer to the apparatus embodiments shown in FIG. 12 and FIG. 13. Details are not described herein again.

It should be noted that, for ease of description, the foregoing method embodiments are represented as a series of actions. However, a person skilled in the art should appreciate that the present invention is not limited to the described order of the actions, because according to this application, some steps may be performed in other orders or simultaneously. It should be further appreciated by a person skilled in the art that the embodiments described in this specification all belong to preferred embodiments, and the involved actions and modules are not necessarily required by this application.

In the foregoing embodiments, the description of each embodiment has respective focuses. For a part that is not described in detail in an embodiment, refer to related descriptions in other embodiments.

The steps of the method in the embodiments of the present invention may be adjusted in sequence, combined or deleted depending on an actual requirement.

The units in the apparatus in the embodiments of the present invention may be combined, divided, or deleted based on an actual requirement.

A person of ordinary skill in the art can understand that all or some of the steps of the method in the embodiments may be implemented by a program instructing related hardware. The program may be stored in a computer readable storage medium. The storage medium may include a flash memory, a read-only memory (Read-Only Memory, ROM), a random access memory (Random Access Memory, RAM), a magnetic disk, an optical disc, or the like.

The application processing method and apparatus for an embedded universal integrated circuit card provided in the embodiments of the present invention are described in detail above. The principle and implementation of the present invention are described herein through specific examples. The description about the foregoing embodiments is merely provided to help understand the method and core ideas of the present invention. In addition, a person of ordinary skill in the art can make variations and modifications in terms of the specific implementations and application scopes based on the ideas of the present invention. Therefore, the content of this specification shall not be construed as a limit to the present invention.

What is claimed is:

1. An application processing method for an embedded universal integrated circuit card, comprising:

activating, by an apparatus, an embedded universal integrated circuit card (eUICC);

selecting, by the apparatus, an Issuer Security Domain Root (ISD-R) application on the eUICC during an initialization process of the eUICC; and obtaining, by the apparatus, eUICC information.

2. The method according to claim 1, wherein after the obtaining, by the apparatus, eUICC information, the method further comprises:

sending, by the apparatus, the eUICC information to a Local Profile Assistant (LPA) module.

3. The method according to claim 1, wherein the eUICC information comprises:

at least one of eUICC identity information, information about a profile on the eUICC, or eUICC capability information.

4. The method according to claim 3, wherein when the eUICC information comprises the information about the profile on the eUICC, the profile on the eUICC comprises:

at least one of information about all profiles on the eUICC, information about an enabled profile on the eUICC, information about a disabled profile on the eUICC, information about a preconfigured-type profile on the eUICC, information about a test-type profile on the eUICC, information indicating that there is no operable profile on the eUICC, and information indicating that there is no enabled profile on the eUICC.

5. The method according to claim 3, wherein when the eUICC information comprises the eUICC capability information, the eUICC capability information comprises:

at least one of a protocol version number supported by the eUICC, an identifier of a key supported by the eUICC, a category of the eUICC, or capability information of a LPA module supported by the eUICC.

6. The method according to claim 5, wherein when the eUICC capability information comprises the protocol version number supported by the eUICC, the method further comprises:

obtaining, by the apparatus by using the LPA module, the protocol version number supported by the eUICC, and determining, based on the protocol version number supported by the eUICC, a protocol version number used for communication between the LPA module and the eUICC.

7. The method according to claim 5, wherein the ISD-R application is selected by a modem of the apparatus.

8. The method according to claim 5, wherein when the eUICC capability information comprises the capability information of the LPA supported by the eUICC, the method further comprises:

after the LPA module obtains the capability information of the LPA supported by the eUICC, determining, by the LPA module based on the capability information of the LPA module, whether to activate the LPA module.

9. The method according to claim 1, wherein the method further comprises:

if there is no enabled profile on the eUICC, maintaining a session between the apparatus and the eUICC.

10. The method according to claim 1, wherein after the selecting, by the apparatus, the ISD-R application on the eUICC, the method further comprises: terminating, by the apparatus, the ISD-R application.

11. The method according to claim 1, wherein the terminating, by the apparatus, the ISD-R application comprises:

after the apparatus completes initialization of the eUICC, terminating, by the apparatus, the ISD-R application.

12. An apparatus, comprising at least one processor, and a memory, wherein a set of program code is stored in the memory, and the program code instructs the at least one processor to perform operations comprising:

activating an embedded universal integrated circuit card (eUICC);

selecting an Issuer Security Domain Root (ISD-R) application on the eUICC during an initialization process of the eUICC; and obtaining eUICC information.

13. The apparatus according to claim 12, wherein the operations comprise:

sending the eUICC information to a Local Profile Assistant (LPA) module.

14. The apparatus according to claim 12, wherein the eUICC information comprises:

at least one of eUICC identity information, information about a profile on the eUICC, or eUICC capability information.

15. The apparatus according to claim 14, wherein when the eUICC information comprises the information about the profile on the eUICC, the profile on the eUICC comprises:

at least one of information about all profiles on the eUICC, information about an enabled profile on the eUICC, information about a disabled profile on the eUICC, information about a preconfigured-type profile on the eUICC, information about a test-type profile on the eUICC, information indicating that there is no operable profile on the eUICC, and information indicating that there is no enabled profile on the eUICC.

16. The apparatus according to claim 14, wherein when the eUICC information comprises the eUICC capability information, the eUICC capability information comprises:

at least one of a protocol version number supported by the eUICC, an identifier of a key supported by the eUICC, a category of the eUICC, or capability information of a local profile assistant (LPA) module.

17. The apparatus according to claim 16, wherein when the eUICC capability information comprises the protocol version number supported by the eUICC, the operations comprise:

obtaining, by using the LPA module, the protocol version number supported by the eUICC, and determining, based on the protocol version number supported by the eUICC, a protocol version number used for communication between the LPA module and the eUICC.

18. The apparatus according to claim 16, wherein the operations further comprise:

if there is no enabled profile on the eUICC, maintaining a session between the apparatus and the eUICC.

19. The apparatus according to claim 16, wherein when the eUICC capability information comprises the capability information of the LPA supported by the eUICC, the operations comprise:

after obtaining the capability information of the LPA supported by the eUICC, determining, based on the capability information of the LPA supported by the eUICC, whether to activate the LPA.

20. The apparatus according to claim 16, wherein the operations further comprise:

after completing initialization of the eUICC, terminating the ISD-R application.

* * * * *